(12) United States Patent
Kwon et al.

(10) Patent No.: US 10,669,356 B2
(45) Date of Patent: Jun. 2, 2020

(54) SUPPORTED HYBRID CATALYST AND METHOD FOR PREPARING OLEFIN POLYMER USING THE SAME

(71) Applicant: LG CHEM, LTD., Seoul (KR)

(72) Inventors: Hyun Jee Kwon, Daejeon (KR); Heon Yong Kwon, Daejeon (KR); Dae Sik Hong, Daejeon (KR); Dae Hwan Kim, Daejeon (KR); Sung Min Lee, Daejeon (KR); Eun Young Shin, Daejeon (KR); Sung Ho Park, Daejeon (KR); Young Suk You, Daejeon (KR); Jin Young Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/742,001

(22) PCT Filed: Jan. 26, 2017

(86) PCT No.: PCT/KR2017/000993
§ 371 (c)(1),
(2) Date: Jan. 4, 2018

(87) PCT Pub. No.: WO2017/131490
PCT Pub. Date: Aug. 3, 2017

(65) Prior Publication Data
US 2018/0194873 A1    Jul. 12, 2018

(30) Foreign Application Priority Data

Jan. 27, 2016 (KR) .................... 10-2016-0010098

(51) Int. Cl.
    C08F 4/653       (2006.01)
    C08F 4/6592      (2006.01)
    C08F 210/16      (2006.01)
    C08L 23/08       (2006.01)
    C08F 110/02      (2006.01)
    C08F 4/52        (2006.01)
    C08F 10/02       (2006.01)
    C08F 10/06       (2006.01)
    C08F 10/08       (2006.01)
    C08F 10/14       (2006.01)
    C08F 12/08       (2006.01)
    C08F 12/36       (2006.01)
    C08F 36/04       (2006.01)
    C08F 36/06       (2006.01)
    C08F 4/659       (2006.01)

(52) U.S. Cl.
    CPC ............ *C08F 4/65927* (2013.01); *C08F 4/52* (2013.01); *C08F 10/02* (2013.01); *C08F 10/06* (2013.01); *C08F 10/08* (2013.01); *C08F 10/14* (2013.01); *C08F 12/08* (2013.01); *C08F 12/36* (2013.01); *C08F 36/045* (2013.01); *C08F 36/06* (2013.01); *C08F 110/02* (2013.01); *C08F 4/6592* (2013.01); *C08F 4/65912* (2013.01); *C08F 4/65916* (2013.01); *C08F 2420/04* (2013.01); *C08F 2420/06* (2013.01); *C08L 23/0815* (2013.01)

(58) Field of Classification Search
    CPC .............. C08F 4/65904; C08F 4/65927; C08F 4/65916; C08F 210/16; C08L 23/0815
    See application file for complete search history.

(56) References Cited

U.S. PATENT DOCUMENTS

| | | | |
|---|---|---|---|
| 5,650,471 | A  | 7/1997  | Abe et al. |
| 6,040,401 | A  | 3/2000  | Nickias et al. |
| 6,060,572 | A  | 5/2000  | Gillis et al. |
| 6,180,736 | B1 | 1/2001  | Muhle et al. |
| 6,316,560 | B1 | 11/2001 | Jacobs et al. |
| 6,372,681 | B1 | 4/2002  | Yamada et al. |
| 6,541,584 | B1 | 4/2003  | Resconi |
| 6,911,508 | B2 | 6/2005  | McCullough |
| 7,396,888 | B2 | 7/2008  | Razavi |
| 7,439,312 | B2 | 10/2008 | Arjunan et al. |
| 9,394,388 | B2 | 7/2016  | Lee et al. |
| 9,556,289 | B2 | 1/2017  | Kwon et al. |
| 9,725,533 | B2 | 8/2017  | Lee et al. |
| 2007/0197374 | A1 | 8/2007 | Yang et al. |
| 2009/0118447 | A1 | 5/2009 | Razavi |
| 2012/0322961 | A1 | 12/2012 | Rauscher et al. |
| 2016/0237188 | A1 | 8/2016 | Hong et al. |
| 2018/0251584 | A1 | 9/2018 | Cho et al. |

FOREIGN PATENT DOCUMENTS

| | | |
|---|---|---|
| CN | 101291960 A    | 10/2008 |
| CN | 101389668 A    | 3/2009 |
| EP | 2003166 A1     | 12/2008 |
| EP | 3339336 A1     | 6/2018 |
| KR | 1020000029869 A | 5/2000 |
| KR | 100385199 B1   | 8/2003 |
| KR | 1020040054697 A | 6/2004 |
| KR | 100509880 B1   | 8/2005 |
| KR | 100517155 B1   | 9/2005 |
| KR | 1020100129981 A | 12/2010 |
| KR | 1020130116395 A | 10/2013 |
| KR | 1020140015666 A | 2/2014 |
| KR | 1020140067410 A | 6/2014 |
| KR | 1020150045368 A | 4/2015 |
| KR | 1020150062004 A | 6/2015 |
| KR | 1020160076415 A | 6/2016 |
| KR | 101658172 B1   | 9/2016 |
| WO | 2007070041 A1  | 6/2007 |

*Primary Examiner* — Caixia Lu
(74) *Attorney, Agent, or Firm* — Dentons US LLP

(57) ABSTRACT

The present invention relates to a supported hybrid catalyst and a method for preparing olefin polymer using the same. Using the supported hybrid catalyst, olefin polymer that maintains excellent mechanical strength of olefin polymer polymerized with the existing metallocene catalyst, but exhibits remarkably improved processibility compared to the existing olefin polymer, can be provided.

5 Claims, No Drawings

SUPPORTED HYBRID CATALYST AND METHOD FOR PREPARING OLEFIN POLYMER USING THE SAME

CROSS-REFERENCE TO RELATED APPLICATION(S)

This application is a National Stage Application of International Application No. PCT/KR2017/000993, filed Jan. 26, 2017, and claims the benefit of Korean Patent Application No. 10-2016-0010098, filed Jan. 27, 2016, contents of which are incorporated herein by reference in their entirety for all purposes as if fully set forth below.

The present invention relates to a supported hybrid catalyst and a method for preparing olefin polymer using the same.

TECHNICAL FIELD

Background Art

In the existing commercial preparation process of polyolefins, Ziegler-Natta catalysts such as titanium or vanadium compounds have been widely used. However, although the Ziegler-Natta catalyst has high activity, it is a multi-active-site catalyst, and thus, has a limit in securing desired properties because the molecular weight distribution of the produced polymer is wide and the compositional distribution of comonomers is not uniform.

Thus, recently, metallocene catalysts wherein a transition metal such as titanium, zirconium, hafnium and the like, and a ligand comprising a cyclopentadiene functional group are bonded were developed and are being widely used. The metallocene compound is generally activated with aluminoxane, borane, borate or other activators before use. For example, a metallocene compound having a ligand comprising a cyclopentadienyl group and two sigma chloride ligands use aluminoxane as an activator.

It is known that the polymer prepared from the metallocene catalyst has excellent mechanical properties. However, since the metallocene catalyst has a single active site, it produces polymer with narrow molecular weight distribution. Thus, the olefin polymer prepared from the metallocene catalyst is known to have poor processibility.

In order to overcome such a problem, there was an attempt to use polymer produced from the metallocene catalyst in combination with low density polyethylene. However, such a method deteriorates the mechanical properties of the polymer produced from the metallocene catalyst, thus decreasing the advantage of using a metallocene catalyst.

DISCLOSURE

Technical Problem

It is an object of the present invention to provide a supported hybrid catalyst capable of providing olefin polymer with high processibility.

It is another object of the present invention to provide a method for preparing olefin polymer using the above supported hybrid catalyst.

Technical Solution

According to one embodiment of the present invention, a supported hybrid catalyst comprising a carrier; a transition metal compound represented by the following Chemical Formula 1, which is supported on the carrier; and one or more kinds of transition metal compounds represented by the following Chemical Formula 2, which are supported on the carrier, is provided:

[Chemical Formula 1]

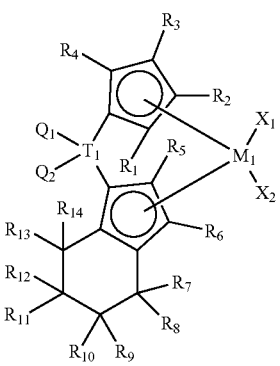

[Chemical Formula 2]

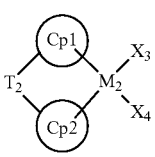

in the Chemical Formulas 1 and 2, $M_1$ and $M_2$ are identical to or different from each other, and each independently, Ti, Zr or Hf, $X_1$, $X_2$, $X_3$ and $X_4$ are identical to or different from each other, and each independently, halogen, a nitro group, an amido group, a phosphine group, a phosphide group, a C1-20 alkyl group, a C1-20 alkoxy group, a C2-20 alkoxyalkyl group, a C1-20 silyl group, a C2-20 alkenyl group, a C6-20 aryl group, a C1-20 sulfonate group, or a C1-20 sulfone group, $T_1$ is C, Si, Ge, Sn or Pb, $T_2$ is a C1-5 alkylene group, a C2-10 alkylidene group, or $T_3(Q_3)(Q_4)$, $T_3$ is C, Si, Ge, Sn or Pb, $Q_1$, $Q_2$, $Q_3$ and $Q_4$ are identical to or different from each other, and each independently, hydrogen, halogen, a C1-20 alkyl group, a C2-20 heterocycloalkyl group, a C1-20 alkoxyl group, a C2-20 alkoxyalkyl group, a C1-20 carboxylate, a C2-20 alkenyl group, a C6-20 aryl group, or a C5-20 heteroaryl group, $R_1$ to $R_6$ are identical to or different from each other, and each independently, hydrogen, a C1-20 alkyl group, a C1-20 alkoxyl group, a C2-20 alkoxyalkyl group, a C1-20 silyl group, a C1-20 silylalkyl group, a C1-20 silyloxyalkyl group, a C2-20 alkenyl group, or a C6-20 aryl group, $R_7$ to $R_{14}$ are identical to or different from each other, and each independently, hydrogen, a C1-20 alkyl group, a C1-20 alkoxyl group, a C2-20 alkoxyalkyl group, a C1-20 silyl group, a C1-20 silylalkyl group, a C1-20 silyloxyalkyl group, a C2-20 alkenyl group, or a C6-20 aryl group, or one or more neighboring pairs of $R_7$ to $R_{14}$ are connected to each other to form a substituted or unsubstituted aliphatic or aromatic ring, Cp1 and Cp2 are identical to or different from each other, and each independently, —$NR_{15}$—, an aromatic ring selected from a cyclopentadienyl group, an indenyl group, a tetrahydroindenyl group, a fluorenyl group or an indenoindolyl group, or the above aromatic ring of which one or more hydrogen atoms are independently substituted with a C1-20 alkyl group, a C1-20 alkoxy group, a C2-20 alkoxyalkyl group, a C1-20 silyl group, a C2-20 silylalkyl group, or a C6-20 aryl group, and $R_{15}$ is a C1-20 alkyl group.

Specifically, in the Chemical Formula 1, $R_1$ to $R_4$ may be each independently, hydrogen, a C1-20 alkyl group, a C1-20 alkoxy group, or a C2-20 alkenyl group.

In the Chemical Formula 1, $R_5$ and $R_6$ may be each independently, hydrogen, a C1-20 alkyl group, a C1-20 alkoxy group, or a C2-20 alkenyl group.

In the Chemical Formula 1, $R_7$ to $R_{14}$ may be each independently, hydrogen, a C1-20 alkyl group, a C1-20 alkoxy group, or a C2-20 alkenyl group, or one or more neighboring pairs of $R_7$ to $R_{14}$ may be connected to each other to form a substituted or unsubstituted aliphatic ring.

In the Chemical Formula 1, $Q_1$ and $Q_2$ may be each independently, a C1-20 alkyl group, or a C6-20 aryl group.

In the Chemical Formulas 1 and 2, $X_1$ to $X_4$ may be each independently, halogen, a C1-20 alkyl group, or a C1-20 alkoxyl group.

In the Chemical Formula 2, $T_2$ may be an ethylene group, an n-propylene group, an iso-propylene group, an ethylidene group, a 1-propylidene group, 2-propylidene group, or $T_3(Q_3)(Q_4)$; $T_3$ may be Si; and $Q_3$ and $Q_4$ may be identical to or different from each other, and each independently, a C1-20 alkyl group, a C1-20 alkoxy group, or a C2-20 alkoxyalkyl group.

In the Chemical Formula 2, Cp1 and Cp2 may be identical to or different from each other, and each independently, —N(tert-butyl)-, a cyclopentadienyl group, a tetramethyl-cyclopentadienyl group, a tert-butoxyhexylcyclopentadienyl group, an indenyl group, a tetrahydroindenyl group, a fluorenyl group, a 5,10-dihydroindeno[1,2-b]indolyl group, or a 5,8-dimethyl-5,10-dihydroindeno[1,2-b]indolyl group.

More specifically, the transition metal compound represented by the Chemical Formula 1 may be a compound represented by the following Chemical Formula 3 or 4:

[Chemical Formula 3]

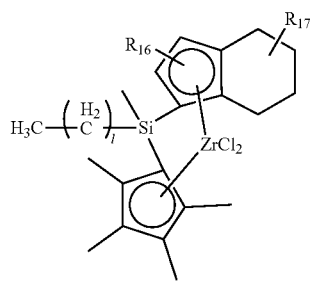

[Chemical Formula 4]

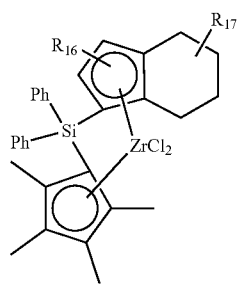

in the Chemical Formulas 3 and 4, $R_{16}$ and $R_{17}$ are identical to or different from each other, and each independently, hydrogen, a C1-20 alkyl group, a C1-20 alkoxy group, a C2-20 alkoxyalkyl group, a C1-20 alkylsilyl group, a C1-20 silylalkyl group, a C1-20 alkoxysilyl group, a C1-20 silyloxyalkyl group, a C2-20 alkenyl group, a C6-20 aryl group, a C7-20 alkylaryl group, or a C7-20 arylalkyl group, and I is an integer of 0 to 5.

The transition metal compound represented by the Chemical Formula 2 may be dimethylsilylene(tetramethylcyclopentadienyl)(9H-fluorene-9-yl)zirconium dichloride.

The supported hybrid catalyst may further comprise one or more kinds of cocatalysts selected from the group consisting of the compounds represented by the following Chemical Formulas 5 to 7:

$R_{19}$—[Al($R_{18}$)—O]$_n$—$R_{20}$     [Chemical Formula 5]

in the Chemical Formula 5, $R_{18}$, $R_{19}$ and $R_{20}$ are each independently, hydrogen, halogen, a C1-20 hydrocarbyl group, or a C1-20 hydrocarbyl group substituted with halogen, and n is an integer of 2 or more, D($R_{21}$)$_3$     [Chemical Formula 6]

in the Chemical Formula 6,

D is aluminium or boron, $R_{21}$'s are each independently, halogen, a C1-20 hydrocarbyl group, or a C1-20 hydrocarbyl group substituted with halogen,

[L-H]$^+$[Z(A)$_4$]$^-$ or [L]$^+$[Z(A)$_4$]$^-$     [Chemical Formula 7]

in the Chemical Formula 7,

L is neutral or cationic Lewis base, H is a hydrogen atom,

Z is a Group 13 atom, A's are each independently, a C1-20 hydrocarbyl group; a C1-20 hydrocarbyloxy group; or a C1-20 hydrocarbyl group or a C1-20 hydrocarbyloxy group of which one or more hydrogen atoms are substituted with halogen, a C1-20 hydrocarbyloxy group or a C1-20 hydrocarbylsilyl group.

The carrier of the supported hybrid catalyst may be silica, alumina, magnesia or a mixture thereof.

The transition metal compound represented by the Chemical Formula 1 and the transition metal compound represented by the Chemical Formula 2 may be included in the weight ratio of 10:0.01 to 10:50.

Meanwhile, according to another embodiment of the present invention, a method for preparing olefin polymer comprisng the step of polymerizing olefin monomers in the presence of the above described supported hybrid catalyst, is provided.

The olefin monomers that can be used in the preparation method may include one or 5/Z/zozo more kinds selected from the group consisting of ethylene, propylene, 1-butene, 1-pentene, 4-methyl-1-pentene, 1-hexene, 1-heptene, 1-octene, 1-decene, 1-undecene, I-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

Advantageous Effects

Using the supported hybrid catalyst according to one embodiment of the present invention, olefin polymer that maintains excellent mechanical strength of olefin polymer polymerized with the existing metallocene catalyst, but exhibits remarkably improved processibility compared to the existing olefin polymer, can be provided.

DETAILED DESCRIPTION OF THE EMBODIMENTS

Hereinafter, a supported hybrid catalyst and a method for preparing olefin polymer using the same according to specific embodiments of the present invention will be explained.

According to one embodiment of the present invention, a supported hybrid catalyst comprising a carrier; a transition metal compound represented by the following Chemical Formula 1, which is supported on the carrier; and one or more kinds of transition metal compounds represented by the following Chemical Formula 2, which are supported on the carrier, s provided:

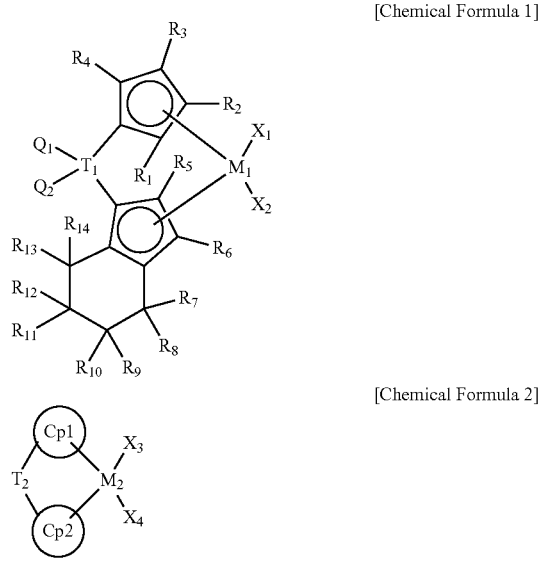

[Chemical Formula 1]

[Chemical Formula 2]

in the Chemical Formulas 1 and 2, $M_1$ and $M_2$ are identical to or different from each other, and each independently, Ti, Zr or Hf, $X_1$, $X_2$, $X_3$ and $X_4$ are identical to or different from each other, and each independently, halogen, a nitro group, an amido group, a phosphine group, a phosphide group, a C1-20 alkyl group, a C1-20 alkoxy group, a C2-20 alkoxyalkyl group, a C1-20 silyl group, a C2-20 alkenyl group, a C6-20 aryl group, a C1-20 sulfonate group, or a C1-20 sulfone group, $T_1$ is C, Si, Ge, Sn or Pb, $T_2$ is a C1-5 alkylene group, a C2-10 alkylidene group, or $T_3(Q_3)(Q_4)$, $T_3$ is C, Si, Ge, Sn or Pb, $Q_1$, $Q_2$, $Q_3$ and $Q_4$ are identical to or different from each other, and each independently, hydrogen, halogen, a C1-20 alkyl group, a C2-20 heterocycloalkyl group, a C1-20 alkoxyl group, a C2-20 alkoxyalkyl group, a C1-20 carboxylate, a C2-20 alkenyl group, a C6-20 aryl group, or a C5-20 heteroaryl group, $R_1$ to $R_6$ are identical to or different from each other, and each independently, hydrogen, a C1-20 alkyl group, a C1-20 alkoxyl group, a C2-20 alkoxyalkyl group, a C1-20 silyl group, a C1-20 silylalkyl group, a C1-20 silyloxyalkyl group, a C2-20 alkenyl group, or a C6-20 aryl group, $R_7$ to $R_{14}$ are identical to or different from each other, and each independently, hydrogen, a C1-20 alkyl group, a C1-20 alkoxyl group, a C2-20 alkoxyalkyl group, a C1-20 silyl group, a C1-20 silylalkyl group, a C1-20 silyloxyalkyl group, a C2-20 alkenyl group, or a C6-20 aryl group, or one or more neighboring pairs of $R_7$ to $R_{14}$ are connected to each other to form a substituted or unsubstituted aliphatic or aromatic ring, Cp1 and Cp2 are identical to or different from each other, and each independently, —$NR_{15}$—, an aromatic ring selected from a cyclopentadienyl group, an indenyl group, a tetrahydroindenyl group, a fluorenyl group or an indenoindolyl group, or the above aromatic ring of which one or more hydrogen atoms are independently substituted with a C1-20 alkyl group, a C1-20 alkoxy group, a C2-20 alkoxyalkyl group, a C1-20 silyl group, a C2-20 silylalkyl group, or a C6-20 aryl group, and $R_{15}$ is a C1-20 alkyl group.

Unless otherwise limited herein, the following terms may be defined as follows.

Halogen may be fluorine(F), chlorine(Cl), bromine(Br) or iodine(I).

A C1-20 alkyl group may be a linear, branched or cyclic alkyl group. Specifically, the C1-20 alkyl group may be a C1-20 linear alkyl group; a C1-10 linear alkyl group; a C1-5 linear alkyl group; a C3-20 branched or cyclic alkyl group; a C3-15 branched or cyclic alkyl group; or a C3-10 branched or cyclic alkyl group. More specifically, the C1-20 alkyl group may be methyl, ethyl, n-propyl, iso-propyl, n-butyl, iso-butyl, tert-butyl, n-pentyl, iso-pentyl, tert-butyl, n-pentyl, iso-pentyl, neo-pentyl, or cyclohexyl, etc.

A C1-5 alkylene group may be a linear or branched alkylene group. Specifically, the C1-5 alkylene group may be a C1-5 linear alkylene group; or a C3-5 branched alkylene group. More specifically, the C1-5 alkylene group may be methylene, ethylene, n-propylene, 1,2-propylene, n-butylene, 1,2-butylene or isobutylene, etc.

A C2-10 alkylidene group may be a linear or branched alkylidene group. Specifically, the C2-10 alkylidene group may be a C2-10 linear alkylidene group; a C2-5 linear alkylidene group; a C3-10 branched alkylidene group; or a C3-5 branched alkylidene group. More specifically, the C2-10 alkylidene group may be ethylidene or propylidene, etc.

A C2-20 heterocycloalkyl group may be a cyclic alkyl group comprising one or more atoms other than carbon, such as oxygen, nitrogen or sulfur, etc. Specifically, the C2-20 heterocycloalkyl group may be a C2-15 heterocycloalkyl group, a C2-10 heterocycloalkyl group or a C4-7 heterocycloalkyl group. More specifically, the C2-20 heterocycloalkyl group may be an epoxy group, a tetrahydrofuranyl group, a tetrahydropyranyl group, a tetrahydrothiophenyl group, or a tetrahydropyrrolyl group, etc.

A C1-20 alkoxy group may be a linear, branched or cyclic alkoxy group. Specifically, the C1-20 alkoxy group may be a C1-20 linear alkoxy group; a C1-10 linear alkoxy group; a C1-5 linear alkoxy group; a C3-20 branched or cyclic alkoxy group; a C3-15 branched or cyclic alkoxy group; or a C3-10 branched or cyclic alkoxy group. More specifically, the C1-20 alkoxy group may be a methoxy group, an ethoxy group, an an-propoxy group, an iso-propoxy group, an n-butoxy group, an iso-butoxy group, a tert-butoxy group, an n-pentoxy group, an iso-pentoxy group, a neo-pentoxy group, or a cyclohexoxy group, etc.

A C2-20 alkoxyalkyl group may be a structure comprising —$R^a$—O—$R^b$ wherein one or more hydrogen atoms of an alkyl group (—$R^a$) are substituted with an alkoxy group (—O—$R^b$). Specifically, the C2-20 alkoxyalkyl group may be a methoxymethyl group, a methoxyethyl group, an ethoxymethyl group, an iso-propoxymethyl group, an isopropoxyethyl group, an iso-propoxyheptyl group, a tert-butoxymethyl group, a tert-butoxyethyl group, or a tert-butoxyhexyl group, etc.

A C1-20 silyl group may be a substituent wherein one or more hydrogen atoms of —SiH$_3$ are substituted with an alkyl group or an alkoxy group. Specifically, the C1-20 silyl group may be a methylsilyl group, a dimethylsilyl group, a trimethylsilyl group, a dimethylethylsilyl group, a diethylmethylsilyl group, a dimethylpropylsilyl group, a methoxysilyl group, a dimethoxysilyl group, a trimethoxysilyl group, a dimethoxyethoxysilyl group, a diethoxymethylsilyl group or a dimethoxypropylsilyl group, etc.

A C1-20 silylalkyl group may be a substituent wherein one or more hydrogen atoms of an alkyl group are substituted with a silyl group. Specifically, the C1-20 silylalkyl group may be a dimethoxypropylsilylmethyl group, etc.

A C1-20 silyloxyalkyl group may be a substituent wherein one or more hydrogen atoms of an alkyl group are substituted with a silyloxy group. Specifically, the C1-20 silyloxyalkyl group may be a dimethoxypropylsilyloxymethyl group, etc.

A C2-20 alkenyl group may be a linear, branched or cyclic alkenyl group. Specifically, the C2-20 alkenyl group may be a C2-20 linear alkenyl group, a C2-10 linear alkenyl group, a C2-5 linear alkenyl group, a C3-20 branched alkenyl group, a C3-15 branched alkenyl group, a C3-10 branched alkenyl group, a C5-20 cyclic alkenyl group or a C5-10 cyclic alkenyl group. More specifically, the C2-20 alkenyl group may be an ethenyl group, a propenyl group, a butenyl group, a pentenyl group or a cyclohexenyl group, etc.

A C1-20 carboxylate has a structure of —COOR$^c$ wherein R$^c$ may be a C1-20 hydrocarbyl group. The hydrocarbyl group is a monovalent functional group obtained by removing a hydrogen atom from hydrocarbon, and may include an alkyl group, an aryl group, etc. Specifically, the C1-20 carboxylate may be pivalate, etc.

A C6-20 aryl group means monocyclic, bicyclic or tricyclic aromatic hydrocarbon. And, the aryl group may be used to include an aralkyl group wherein one or more hydrogen atoms of an alkyl group are substituted with an aryl group. Specifically, the C6-20 aryl group a phenyl group, a naphthyl group, an anthracenyl group or a benzyl group, etc.

A C5-20 heteroaryl group may be a cyclic aryl group comprising one or more atoms other than carbon, such as oxygen, nitrogen and sulfur, etc. Specifically, the C5-20 heteroaryl group may be a C5-15 heteroaryl group or a C5-10 heteroaryl group. More specifically, the C5-20 heteroaryl group may be a furanyl group, a pyranyl group, a thiophenyl group, or a pyrrolyl group, etc.

A C1-20 sulfonate group has a structure of —O—SO$_2$—R$^d$ wherein R$^d$ may be a C1-20 hydrocarbyl group. Specifically, the C1-20 sulfonate group may be a methanesulfonate group or a phenylsulfonate group, etc.

A C1-20 sulfone group has a structure of —R$^{e'}$—SO$_2$—R$^{e''}$ wherein R$^{e'}$ and R$^{e''}$ may be identical to or different from each other, and each independently, a C1-20 hydrocarbyl group. Specifically, the C1-20 sulfone group may be a methylsulfonylmethyl group, a methylsulfonylpropyl group, a methylsulfonylbutyl group or a phenylsulfonylpropyl group, etc.

And, as used herein, the description that one or more neighboring pairs of substituents are connected to each other to form a substituted or unsubstituted aliphatic or aromatic ring means that among the pairs of two substituents neighboring with each other, one or more pairs of the substituents are connected to each other to form an aliphatic or aromatic ring, and that the aliphatic or aromatic ring may be substituted with any substituents.

The above described substituents may be optionally substituted with one or more substituents selected from the group consisting of a hydroxy group, halogen, an alkyl group, a heterocycloalkyl group, an alkoxy group, an alkenyl group, a silyl group, a phosphine group, a phosphide group, a sulfonate group, a sulfone group, an aryl group and a heteroaryl group, within a range where the effects equivalent or similar to aimed effects are manifested.

Using the supported hybrid catalyst wherein a transition metal compound represented by the Chemical Formula 1 and one or more transition metal compounds represented by the Chemical Formula 2 are supported together, olefin polymer that maintains excellent mechanical strength of olefin polymer polymerized with the existing metallocene catalyst, but exhibits remarkably improved processibility compared to the existing olefin polymer, can be provided.

Hereinafter, the structures of the transition metal compounds of the Chemical Formulas 1 and 2 will be explained in detail.

The cyclopentadienyl ligand in the structure of the transition metal compound represented by the Chemical Formula 1 may have an influence on olefin polymerization activity, for example.

$R_1$ to $R_4$ of the cyclopentadienyl ligand may be each independently, hydrogen C1-20 alkyl group, C1-20 alkoxy group or C2-20 alkenyl group. More specifically, $R_1$ to $R_4$ may be each independently, a methyl group, an ethyl group, a propyl group or a butyl group. In this case, the supported hybrid catalyst may exhibit very high activity in the process of olefin polymerization.

And, the tetrahydroindenyl ligand in the transition metal compound represented by the Chemical Formula 1 may, for example, control the degree of steric hindrance effect according to the kind of substituted functional groups, thus easily controlling the molecular weight of prepared olefin polymer.

In the Chemical Formula 1, $R_5$ and $R_6$ may be each independently, hydrogen, a C1-20 alkyl group, a C1-20 alkoxy group or a C2-20 alkenyl group, and $R_7$ to $R_{14}$ may be each independently, hydrogen, a C1-20 alkyl group, a C1-20 alkoxy group or a C2-20 alkenyl group, or one or more neighboring pairs of $R_7$ to $R_{14}$ may be connected to each other to form a substituted or unsubstituted aliphatic or aromatic ring. More specifically, in the Chemical Formula 1, $R_5$ and $R_6$ may be each independently, hydrogen, a C1-4 alkyl group, a C1-4 alkoxy group or a C2-4 alkenyl group, and $R_7$ to $R_{14}$ may be each independently, hydrogen, a C1-4 alkyl group, a C1-4 alkoxy group or a C2-4 alkenyl group, or one or more neighboring pairs of $R_7$ to $R_{14}$ may be connected to each other to form a substituted or unsubstituted aliphatic ring. In this case, the supported hybrid catalyst may provide olefin polymer with excellent processibility.

The cyclopentadienyl ligand and the tetrahydroindenyl ligand may be cross linked by -T$_1$(Q$_1$)(Q$_2$)- to exhibit excellent stability and more improved catalytic activity.

In order to more effectively secure such effect, a transition metal compound wherein Q$_1$ and Q$_2$ are each independently a C1-20 alkyl group or a C6-20 aryl group, may be used. More specifically, a transition metal compound wherein Q$_1$ and Q$_2$ are identical to each other, and a methyl group, ethyl group, a propyl group, a butyl group, a phenyl group or a benzyl group, may be used. And, T$_1$ may be C, Si, Ge, Sn or Pb; or C or Si; or Si.

Meanwhile, between the cross linked cyclopentadienyl ligand and tetrahydroindenyl ligand, $M_1(X_1)(X_2)$ exhibits, which may have an influence on the storage stability of metal complex.

In order to more effectively secure such effect, a transition metal compound wherein $X_1$ and $X_2$ are each independently halogen, a C1-20 alkyl group or a C1-20 alkoxy group, may be used. More specifically, a transition metal compound wherein $X_1$ and $X_2$ are each independently F, Cl, Br or I, may be used. And, $M_1$ may be Ti, Zr or Hf; or Zr or Hf; or Zr.

For example, a transition metal compound capable of providing olefin polymer with more improved processbility may be a compound represented by the following Chemical Formula 3 or 4.

[Chemical Formula 3]

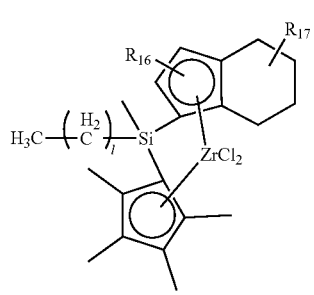

[Chemical Formula 4]

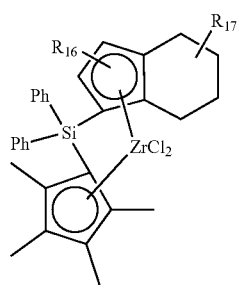

in the Chemical Formulas 3 and 4, $R_{16}$ and $R_{17}$ are identical to or different from each other, and each independently, hydrogen, a C1-20 alkyl group, a C1-20 alkoxy group, a C2-20 alkoxyalkyl group, a C1-20 alkylsilyl group, a C1-20 silylalkyl group, a C1-20 alkoxysilyl group, a C1-20 silyloxyalkyl group, a C2-20 alkenyl group, a C6-20 aryl group, a C7-20 alkylaryl group, or a C7-20 arylalkyl group, and l is an integer of 0 to 5.

In the Chemical Formulas 3 and 4, the substituents of the tetrahydroindenyl ligand, $R_{16}$ and $R_{17}$ may be each independently, hydrogen, a C1-20 alkyl group, a C1-20 alkoxy group, a C2-20 alkenyl group or a C6-20 aryl group; or hydrogen, a C1-4 alkyl group, a C1-4 alkoxy group, a C2-4 alkenyl group or a C6-10 aryl group, so as to provide olefin polymer with more excellent processibility.

Meanwhile, one or more kinds of transition metal compounds represented by the Chemical Formula 2 may be supported together with the transition metal compound of the Chemical Formula 1, thus providing olefin polymer with improved processibility.

In order to more effectively secure such effect, a transition metal compound wherein Cp1 and Cp2 of the Chemical Formula 2 are each independently, —N(tert-butyl)-, a cyclopentadienyl group, a tetramethylcyclopentadienyl group, a tert-butoxyhexylcyclopentadienyl group, an indenyl group, a tetrahydroindenyl group, a fluorenyl group, 5,10-dihydroindeno[1,2-b]indolyl group or a 5,8-dimethyl-5,10-dihydroindeno[1,2-b]indolylgroup, may be used.

And, a transition metal compound wherein $T_2$ crosslinking the Cp1 and Cp2 is an ethylene group, an n-propylene group, an iso-propylene group, an ethylidene group, a 1-propylidene group, 2-propylidene group, or $T_3(Q_3)(Q_4)$, may be used. Wherein $T_3$ may be Si; and $Q_3$ and $Q_4$ may be identical to or different from each other, and each independently, a C1-20 alkyl group, a C1-20 alkoxy group, or a C2-20 alkoxyalkyl group.

Between the two ligands, $M_2(X_3)(X_4)$ exists, which may have an influence on the storage stability of metal complex. In order to more effectively secure such effect, a transition metal compound wherein $X_3$ and $X_4$ are each independently halogen, a C1-20 alkyl group or a C1-20 alkoxy group, may be used. More specifically, a transition metal compound wherein $X_3$ and $X_4$ are each independently F, Cl, Br or I, may be used. And, $M_2$ may be Ti, Zr or Hf; or Ti or Zr.

As the transition metal compound represented by the Chemical Formula 2, one kind or two or more kinds may be used. Among them, in order to economically provide olefin polymer with desired properties, one kind or two kinds of the transition metal compounds represented by the Chemical Formula 2 may be used.

For example, the supported hybrid catalyst may comprise one kind of the transition metal compound represented by the Chemical Formula 1 and one kind of the transition metal compound represented by the Chemical Formula 2, wherein the transition metal compound represented by the Chemical Formula 1 may comprise the compound of the Chemical Formula 3 wherein $R_{16}$ and $R_{17}$ are hydrogen and l is 0, or the compound of the Chemical Formula 4 wherein $R_{16}$ and $R_{17}$ are hydrogen, and the transition metal compound represented by the Chemical Formula 2 may comprise dimethylsilylene(tetramethylcyclopentadienyl)(9H-fluoren-9-yl) zirconium dichloride, thus providing olefin polymer exhibiting more excellent catalytic activity and having more excellent processibility, The transition metal compounds represented by the Chemical Formulas 1 and 2 may be synthesized applying known reactions, and for more detailed synthesis method, preparation examples may be referred to.

The supported hybrid catalyst according to one embodiment may further comprise a cocatalyst so as to activate the transition metal compounds of the Chemical Formulas 1 and 2. As the cocatalyst, those commonly used in the technical field to which the present invention pertains may be used without specific limitations. As non-limiting examples, the cocatalyst may be one or more compounds selected from the group consisting of the compounds represented by the following Chemical Formulas 5 to 7.

$$R_{19}-[Al(R_{18})-O]_n-R_{20} \quad \text{[Chemical Formula 5]}$$

in the Chemical Formula 5, $R_{18}$, $R_{19}$ and $R_{20}$ are each independently, hydrogen, halogen, a C1-20 hydrocarbyl group, or a C1-20 hydrocarbyl group substituted with halogen, and n is an integer of 2 or more, $$D(R_{21})_3 \quad \text{[Chemical Formula 6]}$$

in the Chemical Formula 6,

D is aluminium or boron, $R_{21}$'s are each independently, halogen, a C1-20 hydrocarbyl group, or a C1-20 hydrocarbyl group substituted with halogen, $$[L-H]^+[Z(A)_4]^- \text{ or } [L]^+[Z(A)_4]^- \quad \text{[Chemical Formula 7]}$$

in the Chemical Formula 7,

L is neutral or cationic Lewis base, H is a hydrogen atom, Z is a Group 13 atom, A's are each independently, a C1-20 hydrocarbyl group; a C1-20 hydrocarbyloxy group; or a C1-20 hydrocarbyl group or a C1-20 hydrocarbyloxy group of which one or more hydrogen atoms are substituted with halogen, a C1-20 hydrocarbyloxy group or a C1-20 hydrocarbylsilyl group.

Non-limiting examples of the compound represented by the Chemical Formula 5 may include methylaluminoxane, ethylaluminoxane, isobutylaluminoxane, tert-butylaluminoxane, etc. And, non-limiting examples of the compound represented by the Chemical Formula 6 may include trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc. And, non-limiting examples of the compound represented by the Chemical Formula 7 may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi(dodecyl)ammonium tetrakis(pentafluorophenyl)borate, etc.

The cocatalyst may be used in an appropriate content so that the activation of the transition metal compounds of the Chemical Formulas 1 and 2 may be sufficiently progressed.

Meanwhile, as the carrier of the supported hybrid catalyst according to one embodiment, carriers containing hydroxyl groups or siloxane groups on the surface may be used. Specifically, carriers dried at high temperature to remove moisture on the surface, thus containing highly reactive hydroxyl groups or siloxane groups may be used. More specifically, as the carrier, silica, alumina, magnesia or a mixture thereof may be used. The carrier may be dried at high temperature, and may commonly include oxide, carbonate, sulfate, nitrate components such as $Na_2O$, $K_2CO_3$, $BaSO_4$, $Mg(NO_3)_2$, etc.

The supported hybrid catalyst according to one embodiment may be prepared, for example, by the steps of supporting a cocatalyst on a carrier; and supporting the transition metal compound of the Chemical Formula 1 and the transition metal compound of the Chemical Formula 2 on the cocatalyst-supported carrier one at a time regardless of the sequence or simultaneously.

Specifically, in the step of supporting a cocatalyst on a carrier, a high temperature dried carrier and a cocatalyst may be mixed, and stirred at a temperature of about 20 to 120° C., thus preparing a cocatalyst-supported carrier.

And, in the step of supporting the transition metal compounds on the cocatalyst-supported carrier, the transition metal compounds of the Chemical Formulas 1 and 2 may be simultaneously added to the cocatalyst-supported carrier; or one of the transition metal compounds of the Chemical Formulas 1 and 2 may be added. And, the obtained solution may be stirred at a temperature of about 20 to 120° C. If only one kind of the transition metal compound has been added previously, the other kind of the metal transition metal compound may be added, and the obtained solution be stirred again at a temperature of about 20 to 120° C., thus preparing a supported catalyst.

The transition metal compound of Chemical Formula 1 and transition metal compound of Chemical Formula 2 may be mixed at an appropriate ratio according to the use of olefin polymer to be provided. For example, a weight ratio of the transition metal compound of Chemical Formula 1 to the transition metal compound of Chemical Formula 2 may be from 10:0.01 to 10:50, from 10:0.1 to 10:20, from 10:1 to 10:15, or from 10:1 to 10:12. In case two or more kinds of the transition metal compounds of the Chemical Formula 2 are used, the two or more kinds of the compounds may be used so that the total content may satisfy the above range.

The contents of the carrier, cocatalyst, cocatalyst-supported carrier, and the transition metal compounds of the Chemical Formulas 1 and 2 used to prepare the supported hybrid catalyst may be appropriately controlled according to the intended properties or effects of the supported catalyst.

When preparing the supported hybrid catalyst, as a reaction solvent, for example, aliphatic hydrocarbon solvents such as pentane, hexane, heptanes, nonane, decane and isomers thereof; aromatic hydrocarbon solvents such as toluene, xylene and benzene; or chlorine-substituted hydrocarbon solvents such as dichloromethane and chlorobenzene, etc. may be used. And, since the supported hybrid catalyst sensitively reacts with moisture or oxygen, it may be prepared under inert atmosphere such as nitrogen or argon.

For detailed preparation method of the supported hybrid catalyst, preparation examples described below may be referred to. However, the prepration method of a supported hybrid catalyst is not limited to the contents described herein, but the preparation method may further adopt the steps commonly adopted in the technical field to which the present invention pertains, and the step(s) of the preparation method may be modified by commonly modifiable step(s).

Meanwhile, according to another embodiment of the present invention, a method for preparing olefin polymer comprsing the step of polymerizing olefin monomers in the presence of the above described supported hybrid catalyst, is provided.

As explained above, the supported hybrid catalyst may synthesize olefin polymer with remarkably improved processibility, due to the specific structure of the transition metal compounds of the Chemical Formulas 1 and 2.

The olefin monomers that can be polymerized with the supported hybrid catalyst may include ethylene, alpha-olefin, cyclic olefin, etc., and diene olefin monomers or triene olefin monomers, etc. having two or more double bonds may be polymerized. Specific examples of the monomers may include ethylene, propylene, 1-butene, 1-pentene, 4-methyl-1-pentene, 1-hexene, 1-heptene, I-octene, 1-decene, 1-undecene, 1-dodecene, I-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene, etc., and two or more kinds of these monomers may be mixed and copolymerized. In case the olefin polymer is a copolymer of ethylene with other comonomers, the comonomers may be preferably one or more comonomers selected from the group consisting of propylene, 1-butene, 1-hexene, 4-methyl-1-pentene and 1-octene.

For the polymerization reaction of the olefin monomers, various polymerization processes known as the polymerization reaction of olefin monomers such as a continuous type solution polymerization process, a bulk polymerization process, a suspension polymerization process, a slurry polymerization process or an emulsion polymerization process, etc. may be used. Such polymerization reactions may be conducted at a temperature of about 50 to 110° C. or about 60 to 100° C. under pressure of about 1 to 100 bar or about 10 to 80 bar.

And, in the polymerization reaction, the supported hybrid catalyst may be used while being dissolved or diluted in a solvent such as pentane, hexane, heptanes, nonane, decane, toluene, benzene, dichloromethane, chlorobenzene, etc. Here, by treating the solvent with a small amount of alkylaluminium, etc., a small amount of water or air that may have an adverse influence on the catalyst may be removed in advance.

For example, using the supported hybrid catalyst, olefin polymer with high processibility can be prepared. For example, the olefin polymer prepared through the supported hybrid catalyst may exhibit MFRR (10/2.16) (melt flow rate ratio (10/2.16)) of 9.1 or more. The MFRR is a value measured under the conditions described in the experimental example below. Such olefin polymer may exhibit remarkably improved processibility compared to the existing olefin polymer, while maintaining the excellent mechanical strength of the olefin polymer polymerized with the existing metallocene catalyst.

Hereinafter, referring to specific examples of the invention, the actions and the effects of the present invention will be explained in more detail. However, these are presented only as the illustrations of the present invention, and the scope of the present invention is not limited thereby.

Preparation Example 1: Preparation of a Transition Metal Compound (Metallocene Catalyst Precursor A)

In a dried 250 mL schlenk flask, tetramethylcyclopentadiene (TMCP, 6.0 mL, 40 mmol) was dissolved in THF (60 mL), and then, the solution was cooled to −78° C. Subsequently, to the solution, n-BuLi (2.5M, 17 mL, 42 mmol) was slowly added dropwise, and then, the obtained solution was stirred at room temperature overnight.

Meanwhile, in a separate 250 mL schlenk flask, dichlorodimethylsilane (4.8 mL, 40 mmol) was dissolved in n-hexane, and then, the solution was cooled to −78° C. Subsequently, to the solution, the previously prepared TMCP-lithiation solution was slowly introduced. And, the obtained solution was stirred at room temperature overnight.

Thereafter, the obtained solution was decompressed to remove the solvent from the solution. And, the obtained solid was dissolved in toluene, and filtered to remove remaining LiCl, thus obtained an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

In a dried 250 mL schlenk flask, indene (0.93 mL, 8.0 mmol) was dissolved in THF (30 mL), and then, the solution was cooled to −78° C. Subsequently, to the solution, n-BuLi (2.5M, 3.4 mL, 8.4 mmol) was slowly added dropwise, and then, the obtained solution was stirred at room temperature for about 5 hours.

Meanwhile, in a separate 250 mL schlenk flask, the previously synthesized intermediate (1.7 g, 8.0 mmol) was dissolved in THF, and the solution was cooled to −78° C. Subsequently, to the solution, the previously prepared indene-lithiation solution was slowly introduced. And, the obtained solution was stirred at room temperature overnight, thus obtaining a reddish purple solution.

Thereafter, water was poured into the reactor to finish the reaction (quenching), and an organic layer was extracted from the mixture with ether. It was confirmed through $^1$H NMR that dimethyl(indenyl)(tetramethylcyclopentadienyl) silane and other kinds of organic compounds are included in the organic layer. The organic layer was concentrated and used for metallation as it is without purification.

In a 250 mL schlenk flask, the previously synthesized dimethyl(indenyl)(tetramethylcyclopentadienyl)silane (1.7 g, 5.7 mmol) was dissolved in toluene (30 mL) and MTBE (3.0 mL). And, the solution was cooled to −78° C., and to the solution, n-BuLi (2.5M, 4.8 mL, 12 mmol) was slowly added dropwise, and then, the obtained solution was stirred at room temperature overnight. However, yellow solid was produced in the solution and the solution was not uniformly stirred, and thus, MTBE (50 mL) and THF (38 mL) were additionally introduced.

Meanwhile, in a separate 250 mL schlenk flask, ZrCl$_4$(THF)$_2$ was dispersed in toluene, and then, the obtained mixture was cooled to −78° C. Subsequently, to the mixture, the previously prepared lithiated ligand solution was slowly introduced. And, the obtained mixture was stirred overnight.

Thereafter, the reaction product was filtered to obtain dimethylsilylene(tetramethylcyclopentadienyl)(indenyl)zirconium dichloride (1.3 g, containing LiCl (0.48 g), 1.8 mmol) in the form of yellow solid, followed by solvent removal from the filtrate and washing with n-hexane to additionally obtain yellow solid (320 mg, 0.70 mmol) (total 44% yield).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

The previously synthesized dimethylsilylene(tetramethylcyclopentadienyl)(indenyl)zirconium dichloride (1.049 g, 2.3 mmol) was put in a mini bombe in a glove box. And, platinum oxide (52.4 mg, 0.231 mmol) was additionally put in the mini bombe, and the mini bombe was assembled, and then, anhydrous THF (30 mL) was put into the mini bombe using a canuula, and hydrogen was filled to the pressure of about 30 bar. Subsequently, the mixture in the mini bombe was stirred at about 60° C. for about one day, and then, the temperature of the mini bombe was cooled to room temperature, and hydrogen was substituted with argon while slowly lowering the pressure of the mini bombe.

Meanwhile, celite dried in an oven of about 120° C. for about 2 hours was spread in a schlenk filter, and using the same, the reaction product of the mini bombe was filtered under argon. By the celite, a PtO$_2$ catalyst was removed from the reaction product. Subsequently, the catalyst-removed reacton product was decompressed to remove the solvent, thus obtaining light yellow solid of dimethylsilylene(tetramethylcyclopentadienyl)(tetrahydroindenyl)zirconium dichloride (hereinafter, referred to as 'metallocene catalyst precursor A') (0.601 g, 1.31 mmol, Mw: 458.65 g/mol).

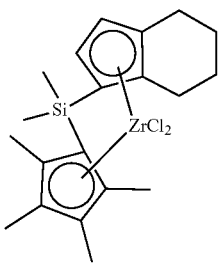

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Preparation Example 2: Preparation of a Transition Metal Compound (Metallocene Catalyst Precursor B)

In a dried 250 mL schlenk flask, TMCP-Li (1.3 g, 10 mmol), CuCN (45 mg, 5 mol %), and THF (10 mL) were introduced. Subsequently, the temperature of the flask was cooled to −20° C. or less, and then, dichlorodiphenylsilane (2.5 g, 10 mmol) was added dropwise, and the obtained mixture was stirred at room temperature for 16 hours.

And, the the temperature of the flask was cooled to −20° C. or less, and then, an indene-lithiation solution (1.2 g, 10 mmol in THF 10 mL) was added dropwise, and the obtained mixture was stirred at room temperature for 24 hours.

Thereafter, the obtained solution was decompressed to remove the solvent from the solution. And, the obtained solid was dissolved in hexane, and filtered to remove remaining LiCl, and the filtrate was decompressed to remove hexane from the filtrate, thus obtaininig diphenyl (indenyl)(tetramethylcyclopentadienyl)silane.

In a 100 mL schlenk flask, the previously synthesized diphenyl(indenyl)(tetramethylcyclopentadienyl)silane (4.2 g, 10 mmol) was dissolved in THF (15 mL). And, the solution was cooled to −20° C. or less, and to the solution, n-BuLi (2.5M in hexane, 8.4 mL, 21 mmol) was slowly added dropwise, and then, the obtained solution was stirred at room temperature for 6 hours.

Meanwhile, in a separate 250 mL schlenk flask, ZrCl$_4$(THF)$_2$ (3.8 g, 10 mmol) was dispersed in toluene (15 mL), and then, the obtained mixture was stirred at −20° C. Subsequently, to the mixture, the previously prepared lithiated ligand solution was slowly introduced. And, the obtained mixture was stirred at room temperature for 48 hours.

Thereafter, the obtained solution was decompressed to remove the solvent from the solution. And, the obtained solid was dissolved in dichloromethane (DCM) to remove remaining LiCl, and the filtrate was vacuum dried to remove DCM. Subsequently, the obtained solid was put in 30 mL of toluene and stirred for 16 hours, and then, filtered to obtain diphenylsilylene(tetramethylcyclopentadienyl)indenyl)zirconium dichloride in the form of lemon-colored solid (2.1 g, 3.6 mmol) (36% yield).

$^1$H NMR (500 MHz, CDCl$_3$): 8.08-8.12 (2H, m), 7.98-8.05 (2H, m), 7.77 (1H, d), 7.47-7.53 (3H, m), 7.42-7.46 (3H, m), 7.37-7.41 (2H, m), 6.94 (1H, t), 6.23 (1H, d), 1.98 (3H, s), 1.95 (3H, s), 1.68 (3H, s), 1.52 (3H, s).

The previously synthesized diphenylsilylene(tetramethylcyclopentadienyl)indenyl)zirconium dichloride (1.0 g, 1.7 mmol), Pd/C (10 mol %), and DCM (40 mL) were introduced into a 100 mL high pressure reactor, and hydrogen was filled to the pressure of about 60 bar. Subsequently, the mixture in the high pressure reactor was stirred at about 80° C. for about 24 hours. If the reaction was finished, the reaction product was passed through a celite pad to remove solid from the reaction product, thus obtaining diphenylsilylene(tetramethylcyclopentadienyl)(tetrahydroindenyl)zirconium dichloride (hereinafter, referred to as 'metallocene catalyst precursor B') (0.65 g, 1.1 mmol, 65% yield).

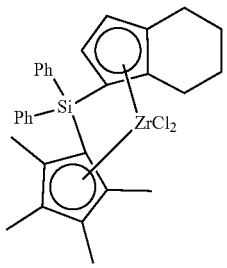

$^1$H NMR (500 MHz, CDCl$_3$): 7.90-8.00 (4H, m), 7.38-7.45 (6H, m), 6.80 (1H, s), 5.71 (1H, s), 3.15-3.50 (1H, m), 2.75-2.85 (1H, m), 2.50-2.60 (1H, m), 2.12 (3H, s), 2.03 (3H, s), 1.97-2.07 (1H, m), 1.76 (3H, s), 1.53-1.70 (4H, m), 1.48 (3H, s).

Preparation Example 3: Preparation of a Transition Metal Compound (Metallocene Catalyst Precursor D)

In a dried 250 mL schlenk flask, 1.622 g (10 mmol) of fluorene was put, and 200 mL of THF was introduced under argon. And, the obtained solution was cooled to 0° C., and then, n-BuLi (2.5 M in hexane, 4.8 mL, 12 mmol) was slowly added dropwise. Subsequently, the temperature of the reaction mixture was raised to room temperature, and then, the reaction mixture was stirred at room temperature overnight.

Meanwhile, in a separate 250 mL schlenk flask, dichlorodimethylsilane (1.2 mL, 10 mmol, Fw 129.06, d 1.07 g/mL) was dissolved in 30 mL of hexane, and then, the solution was cooled to −78° C. Subsequently, to the solution, the previously prepared lithiated solution was slowly introduced. And, the obtained solution was stirred at room temperature for a day.

Meanwhile, 10 mmol of TMCP was dissolved in THF, and then, the solution was cooled to 0° C. Subsequently, to the solution, n-BuLi (2.5 M in hexane, 4.8 mL, 12 mmol) was slowly added dropwise, and then, the obtained solution was stirred at room temperature for a day.

Thereafter, the chloro(9H-fluoren-9-yl)dimethylsilane solution stirred for a day and the lithiated-TMCP solution were mixed with a cannula. Here, even if any solution of the two solutions was transferred with a cannula, it did not have an influence on the experimental results. The mixture of the two solutions was stirred for a day, and then, 50 mL of water was put in the flask to finish the reaction, and an organic layer was separated. MgSO$_4$ was added to the organic layer to remove moisture, followed by vacuum drying to obtain (9H-fluoren-9-yl)(2,3,4,5-tetramethylcyclopenta-2,4-dien-1-yl)silane in the form of yellow powder (3.53 g, 10.25 mmol, 100% yield, NMR based purity 100%, Mw 344.56 g/mol).

$^1$H NMR (500 MHz, CDCl$_3$): −0.36 (6H, s), 1.80 (6H, s), 1.94 (6H, s), 3.20 (1H, s), 4.09 (1H, s), 7.28-7.33 (4H, m), 7.52 (2H, d), 7.83 (2H, d).

In a 250 mL shlenk flask dried in an oven, the previously prepared intermediate was put and dissolved in diethylether, and then, 2.1 equivalents of n-BuLi (8.6 mL, 21.5 mmol) was added dropwise, and the solution was stirred overnight.

Thereafter, the obtained product was dried under vacuum, and then, the obtained slurry was filtered with a schlenk filter to obtain yellow solid. The yellow solid was put in a new 250 mL schlenk flask, and 50 mL of toluene was introduced to prepare a suspension.

Meanwhile, in a glove box, into a separate 250 mL schlenk flask, 1 equivalent of ZrCl$_4$(THF)$_2$ was put, and toluene was introduced to disperse. And, the Zr solution and the previously prepared lithiated ligand solution were cooled to −78° C. Subsequently, to the mixture, the previously prepared lithiated ligand solution was slowly introduced. And, the temperature of the obtained mixture was slowly raised to room temperature, and then, the mixture was stirred for a day.

Thus obtained reaction product was filtered with a schlenk filter under argon for removal of LiCl, but since the solubility of the product was not good, dimethylsilylene(tetramethylcyclopentadienyl)(9H-fluoren-9-yl)zirconium dichloride (hereinafter, referred to as 'metallocene catalyst precursor D') was obtained in the form of a filtercake (3.551 g, 6.024 mmol, 61.35% yield, NMR based purity 85.6 wt % (remaining content is LiCl), Mw 504.68 g/mol).

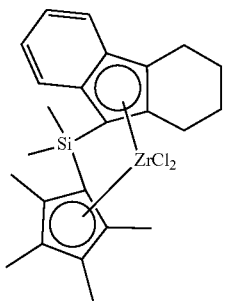

$^1$H NMR (500 MHz, CDCl$_3$): 1.30 (6H, s), 1.86 (6H, s), 1.95 (6H, s), 7.21 (2H, m), 7.53 (2H, m), 7.65 (2H, m), 8.06 (2H, m).

Preparation Example 4: Preparation of a Transition Metal Compound (Metallocene Catalyst Precursor E)

50 g of Mg(S) was added to a 10 L reactor at room temperature, and then, 300 mL of THF was added thereto. About 0.5 g of I$_2$ was added, and then, the temperature of the reactor was maintained at 50° C. After the temperature of the reactor was stabilized, 250 g of 6-t-butoxyhexylchloride was added to the reactor at a speed of 5 mL/min using a feeding pump. It was observed that as 6-t-butoxyhexylchloride was added, the temperature of the reactor increased about 4 to 5° C. While continuously adding 6-t-butoxyhexylchloride, the solution was stirred for 12 hours. After the reaction for 12 hours, a black reaction solution was obtained. 2 mL of the produced black solution was taken, water was added thereto to obtain an organic layer, and 6-t-buthoxyhexane was confirmed through 1 H-NMR. It could be seen from the 6-t-buthoxyhexane that a Gringanrd reaction progressed well. Thus, 6-t-buthoxyhexyl magnesium chloride was synthesized.

500 g of MeSiCl$_3$ and 1 L of THF were added to a reactor, and then, the temperature of the reactor was cooled to −20° C. 560 g of the synthesized 6-t-buthoxyhexyl magnesium chloride was added to the reactor at a speed of 5 mL/min using a feeding pump. After the feeding of a Grignard reagent was finished, the solution was stirred for 12 hours while slowly raising the temperature of the reactor to room temperature. After the reaction for 12 hours, it was confirmed that white MgCl$_2$ salts were produced. 4 L of hexane was added and the salts were removed through labdori, thus obtaining a filtered solution. The filtered solution was added a reactor, and then, hexane was removed at 70° C. to obtain a light yellow liquid. It was confirmed through 1H-NMR that the obtained liquid was methyl(6-t-buthoxy hexyl) dichlorosilane.

1H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 moles (150 g) of tetramethylcyclopentadiene and 2.4 L of THE were added to a reactor, and then, the reactor was cooled to −20° C. 480 mL of n-BuLi was added to the reactor at a speed of 5 mL/min using a feeding pump. After adding n-BuLi, the solution was stirred for 12 hours while slowly raising the temperature of the reactor to room temperature. After the reaction for 12 hours, methyl(6-t-buthoxy hexyl) dichlorosilane(326 g, 350 mL) was rapidly added to the reactor. After the solution was stirred for 12 hours while slowly raising the temperature of the reactor to room temperature, the reactor was cooled again to 0° C., and then, 2 equivalents of t-BuNH$_2$ was added. While slowly raising the temperature of the reactor to a room temperature, the solution was stirred for 12 hours. After the reaction for 12 hours, THF was removed, 4 L of hexane was added, the salts were removed through labdori to obtain a filtered solution. After adding the filtered solution to a reactor again, hexane was removed at 70° C. to obtain a yellow solution. It was confirmed through 1H-NMR that the obtained yellow solution was a methyl(6-t-buthoxyhexyl)(tetramethylcyclopentadieny)t-butylaminosilane compound.

To the methyl(6-t-buthoxyhexyl)(tetramethylcyclopentadieny)t-butylaminosilane, 2 equivalents of n-BuLi were added at −78° C. to prepare a dilithium salt solution. To the dilithium salt solution, TiCl$_3$(THF)$_3$ (10 mmol) was rapidly added at −78° C. And, the obtained reaction solution was stirred for 12 hours while slowly raising the temperature to room temperature. After stirring for 12 hours, PbCl$_2$ (10 mmol) was added to the reaction solution at room temperature, and the solution was stirred for 12 hours. After stirring for 12 hours, a bluish black solution was obtained. THF was removed in the produced reaction solution, and then, hexane was added to filter the product. And, hexane was removed from the obtained filtrate to prepare [methyl(6-t-buthoxyhexyl)silyl(tetramethylcyclopentadienyl)(t-Butylamido)] TiCl$_2$ (hereinafter, referred to as 'metallocene catalyst precursor E').

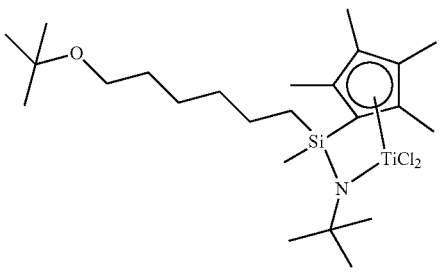

$^1$H-NMR (CDCl$_3$): 3.3 (s, 4H), 2.2 (s, 6H), 2.1 (s, 6H), 1.8-0.8 (m), 1.4 (s, 9H), 1.2 (s, 9H), 0.7 (s, 3H).

Preparation Example 5: Preparation of a Transition Metal Compound (Metallocene Catalyst Precursor F)

2 g of fluorene 2 g was dissolved in 5 mL of MTBE 5 mL and 100 mL hexane, n-BuLi (2.5 M in hexane, 5.5 mL) was added dropwise thereto under a dry ice/acetone bath, and the solution was stirred at room temperature overnight. 3.6 g of (6-(tert-butoxy)hexyl)dichloro(methyl)silane was dissolved in 50 mL of hexane, which was transferred to the fluorene-Li-slurry under a dry ice/acetone bath for 30 minutes, and the solution was stirred at room temperature overnight. Simultaneously, 5,8-dimethyl-5,10-dihydroindeno[1,2-b]indole (12 mmol, 2.8 g) was also dissolved in 60 mL of THF, and then, n-BuLi (2.5 M in hexane, 5.5 mL) was added dropwise thereto under a dry ice/acetone bath, and the solution was stirred at room temperature overnight. The reaction solution of fluorene and (6-(tert-butoxy)hexyl)dichloro(methyl)silane was sampled to confirm the completion of the reaction through NMR, and then, a 5,8-dimethyl-5,10-dihydroindeno[1,2-b]indole-Li solution was transferred under a dry ice/acetone bath. And, the obtained reaction mixture was stirred at room temperature overnight. After the reaction, the product was extracted with ether/water to remove remaining moisture in the organic layer, thus obtaining a ligand compound (Mw 597.90, 12 mmol), and it could be confirmed through $^1$H-NMR that two isomers were produced.

$^1$H NMR (500 MHz, d6-benzene): −0.30∼−0.18 (3H, d), 0.40 (2H, m), 0.65-1.45 (8H, m), 1.12 (9H, d), 2.36-2.40 (3H, d), 3.17 (2H, m), 3.41-3.43 (3H, d), 4.17-4.21 (1H, d), 4.34-4.38 (1H, d), 6.90-7.80 (15H, m)

7.2 g (12 mmol) of the previously synthesized ligand compound was dissolved in 50 mL of diethylether, and then, n-BuLi (2.5 M in hexane, 11.5 mL) was added dropwise thereto under a dry ice/acetone bath, and the solution was stirred at room temperature overnight. And, the obtained reaction product was vacuum dried to obtain sticky oil of brown color. The sticky oil was dissolved in toluene to obtain slurry. ZrCl$_4$(THF)$_2$ was prepared and 50 mL of toluene was added to prepare in the form of slurry. To the sticky oil, 50 mL toluene slurry of ZrCl$_4$(THF)$_2$ was transferred under a dry ice/acetone bath. The obtained reaction mixture changed into violet color as it was stirred at room temperature overnight. The reaction solution was filtered to remove LiCl. Toluene was removed from the filtrate by vacuum drying, followed by addition of hexane, and sonication for 1 hour. And, the obtained slurry was filtered to obtain a transition metal compound in the form of a dark violet solid (hereinafter, referred to as 'metallocene catalyst precursor F')(Mw 758.02, 7.92 mmol, yield 66 mol %). Two isomers were observed on 1H-NMR.

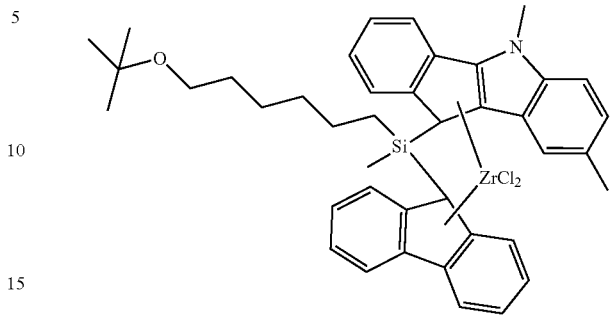

$^1$H NMR (500 MHz, CDCl$_3$): 1.19 (9H, d), 1.71 (3H, d), 1.50-1.70 (4H, m), 1.79 (2H, m), 1.98-2.19 (4H, m), 2.58 (3H, s), 3.38 (2H, m), 3.91 (3H, d), 6.66-7.88 (15H, m)

Preparation Example 6: Preparation of a Transition Metal Compound (Metallocene Catalyst Precursor I)

In a dried 250 mL Schlenk flask, 5.25 g (23.6 mmol) of 2-(6-tert-butoxyhexyl)cyclopenta-1,3-diene was introduced, 50 mL of methanol and 4 mL of acetone were introduced, and then, the solution was cooled to 0° C. 2.95 mL (1.5 equivalents) of pyrrolidine was added thereto dropwise, and then, the temperature of the solution was slowly raised to room temperature, and the solution was stirred for 7 hours. And, 50 mL of water added to quench, and an organic layer was separated and dried with MgSO$_4$. It was confirmed through NMR that as the result, 5.0 g (19.07 mmol, 80.7%) of 2-(6-tert-butoxyhexyl)-5-(propan-2-ylidene)cyclopenta-1,3-diene was produced, which was dissolved in ether.

In a separate dried 250 mL Schlenk flask, 2.784 g (10 mmol) of 2,7-di-tert-butyl-9H-fluorene was introduced, argon atmosphere was made, and then, 50 mL of ether was introduced under reduced pressure to dissolve. The solution was cooled to 0° C., n-BuLi (2.5 M in hexane, 4.8 mL, 12 mmol) was added dropwise, the temperature was raised to room temperature, and then, the solution was stirred for a day. The solution was added dropwise to the previously prepared ether solution of 2-(6-tert-butoxyhexyl)-5-(propan-2-ylidene)cyclopenta-1,3-diene, and then, the obtained solution was stirred for a day. And, 50 mL of water was added to quench, and an organic layer was separated, dried with MgSO$_4$, and filtered to obtain a pure solution. All the solvents were evaporated under vacuum suction to obtain 5.0 g (9.36 mmol, 93.6%) of oil.

NMR based purity (wt %)=100%, Mw=540.86

$^1$H NMR (500 MHz, CDCl$_3$): 0.87 (1H, m), 0.99 (6H, m), 1.19 (9H, s), 1.30 (11H, s), 1.41 (11, s), 1.51-1.67 (5H, m), 3.00, 3.13 (1H, s), 3.35 (2H, m), 3.87, 4.05, 4.09, 4.11 (1H, s), 5.72, 5.97, 6.14, 6.61 (3H, s), 7.28 (1H, m), 7.35 (1H, m), 7.42 (1H, m), 7.58 (2H, m), 7.69 (2H, d)

In an oven-dried 250 mL Schlenk flask, the previously synthesized ligand compound was introduced, and dissolved in 4 equivalents of MTBE and toluene, followed by the addition of 2.1 equivalents of n-BuLi solution (in hexane), and lithiation for 24 hours. In a glove box, 2.1 equivalents of ZrCl$_4$(THF)$_2$ were taken and put in a 250 mL Schlenk flask, and ether was introduced to prepare a suspension. Both flasks were cooled to −78° C., and then, the lithiated ligand compound was slowly added to the suspension of $ZrCl_4(THF)_2$. The temperature of the mixture was slowly raised to room temperature and the mixture was stirred for a day, and then, ether was removed to about 1/5 volume in the mixture by vacuum suction, and hexane was added in the volume of 5 times of the remaining solvent to recrystallize. The prepared hexane slurry was filtered under argon, and the solvents were evaporated under vacuum suction in both the filtered solid and the filtrate. The filter cake remaining on the top and the filtrate were respectively confirmed through NMR, and weighed in a glove box to confirm the yield and purity. From 5.1 g (9.4 mmol) of the ligand compound, 4.4 g (6.3 mmol, 67.4%) of brown solid (hereinafter, referred to as 'metallocene catalyst precursor I') was obtained.

NMR based purity (wt %)=100%, Mw: 700.98

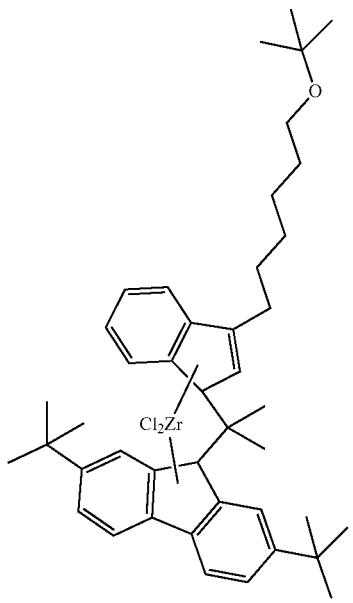

$^1$H NMR (500 MHz, CDCl$_3$): 1.17 (9H, s), 1.23-1.26 (6H, m), 1.27 (12H, s), 1.38 (6H, s), 1.40-1.44 (4H, m), 2.33 (3H, s), 2.36 (3H, s), 3.33 (2H, t), 5.31 (1H, m), 5.54 (1H, m), 5.95 (1H, m), 7.39 (1H, m), 7.58 (2H, m), 7.62 (1H, m), 7.70 (1H, s), 8.00 (1H, t)

Preparation Example 7: Preparation of a Transition Metal Compound (Metallocene Catalyst Precursor J)

In a dried 250 mL Schlenk flask, 2.323 g (20 mmol) of indene was introduced, and 40 ml of MTBE was introduced under argon gas. The solution was cooled to 0° C., n-BuLi (2.5 M in hexane, 9.6 mL, 20 mmol) was added dropwise. The temperature of the mixture was slowly raised to room temperature, and the mixture was stirred for 24 hours.

In a separate dried 250 mL Schlenk flask, 2.713 g (10 mmol) of (6-tert-butoxyhexyl)dichloro(methyl)silane) and 30 mL of hexane were introduced, and the solution was cooled to −78° C., and then, the previously prepared mixture was added dropwise. The temperature of the mixture was slowly raised to room temperature and the mixture was stirred for 24 hours. And, 50 mL of water was added to quench, and an organic layer was separated and dried with MgSO$_4$. As the result, 3.882 g (9.013 mmol, 90.1%) of the product was obtained.

NMR based purity (wt %)=100%, Mw=430.70

$^1$H NMR (500 MHz, CDCl$_3$): −0.45, −0.22, −0.07, 0.54 (total 3H, s), 0.87 (1H, m), 1.13 (9H, m), 1.16-1.46 (10H, m), 3.25 (2H, m), 3.57 (1H, m), 6.75, 6.85, 6.90, 7.11, 7.12, 7.19 (total 4H, m), 7.22-7.45 (4H, m), 7.48-7.51 (4H, m)

In an oven-dried 250 mL Schlenk flask, the previously synthesized ligand compound was introduced, and dissolved in 4 equivalents of MTBE and toluene. And then, 2.1 equivalents of n-BuLi solution (in hexane) were added thereto, followed by lithiation for 24 hours, and removal of all the solvents by vacuum suction. Through a schlenk filter under hexane solvent, only Li-salts were obtained (3.092 g, 6.987 mmol). Such a process is a kind of purification for obtaining purer metallocene catalyst precursor. In a glove box, 2.1 equivalents of $ZrCl_4(THF)_2$ were taken and put in a 250 mL Schlenk flask, and toluene was introduced to prepare a suspension. Both flasks were cooled to −78° C., and then, the lithiated ligand compound was slowly added to the toluene suspension of $ZrCl_4(THF)_2$. The temperature of the mixture was slowly raised to room temperature and the mixture was stirred for a day, and then, toluene was removed from the mixture by vacuum suction, and hexane was added in the volume similar to the solvent to recrystallize. The prepared hexane slurry was filtered under argon, and the solvents were evaporated under vacuum suction in both the filtered solid and the filtrate. The filter cake remaining on the top and the filtrate were respectively confirmed through NMR, and weighed in a glove box to confirm the yield and purity.

From 3.1 g (6.987 mmol) of the ligand compound, 1.321 g (2.806 mmol, 40.2%) of yellow oil (hereinafter, referred to as 'metallocene catalyst precursor J') was obtained, and stored as a toluene solution (0.3371 mmol/mg).

NMR based purity (wt %)=100%, Mw: 605.85

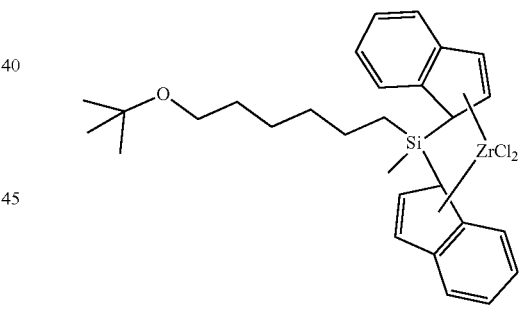

$^1$H NMR (500 MHz, CDCl$_3$): 0.88 (3H, m), 1.15 (9H, m), 1.17-1.47 (10H, m), 1.53 (4H, d), 1.63 (3H, m), 1.81 (1H, m), 6.12 (2H, m), 7.15 (2H, m), 7.22-7.59 (8H, m)

Preparation Example 8: Preparation of a Transition Metal Compound (Metallocene Catalyst Precursor K)

From the reaction of tert-Bu-O—(CH$_2$)$_6$Cl and Mg (0) under a THF solvent, 1.0 mol of a tert-Bu-O—(CH$_2$)$_6$MgCl solution, a Grignard reagent, was obtained. The prepared Grignard reagent was introduced into a flask containing −30° C. MeSiCl$_3$ (176.1 mL, 1.5 mol) and THF (2.0 mL), and the obtained reaction mixture was stirred at room temperature for 8 hours or more. Thereafter, the obtained reaction product was filtered and the filtrate was vacuum dried to obtain tert-Bu-O—(CH$_2$)$_6$SiMeCl$_2$ (yield 92%).

At −30° C., fluorene (100 g, 0.60 mol), hexane (4.5 L) and MTBE (methyl tert-butyl ether, 35.7 mL, 0.3 mol) were introduced into a reactor, 1 equivalent of n-BuLi (2.5 M in Hexane) was slowly added, and then, the solution was stirred at room temperature for 6 hours and stirred at 40° C. for 3 hours or more. Thereafter, the temperature of the reactor was cooled to −30° C., and the above prepared fluorenyl lithium solution was slowly added to tert-Bu-O—$(CH_2)_6SiMeCl_2$ (162.8 g, 0.6 mol) dissolved in hexane (3 L) over 1 hour at −30° C. And, the obtained reaction mixture was stirred at room temperature for 8 hours ore more. Subsequently, the temperature of the reaction mixture was cooled to −30° C., and then, $C_5H_5Na$ (55.9 g, 0.6 mol)/THF (4 L) was added, and the obtained reaction mixture was stirred for 6 hours or more.

Thereafter, all the volatiles of the reaction product were vacuum dried and extracted with hexane to obtain the final ligand, (tert-Bu-O—$(CH_2)_6$)MeSi($C_5H_5$)(9-$C_{13}H_9$) in the form of yellow oil (yield 99%, ligand overall yield 91%). The structure of the ligand was confirmed through $^1$H-NMR.

$^1$H NMR (400 MHz, CDCl$_3$): −0.13, 0.06 (MeSi, 3H, s), 0.27, 0.35 (Si-CH$_2$, 2H, m), 1.19 (tert-BuO, 9H, s), 1.15-1.40 (CH$_2$, 4H, m), 1.41-1.55 (CH$_2$, 4H, m), 2.70, 3.10 (methylene CpH, 2H, brs), 3.31 (tert-BuO-CH$_2$, 2H, t), 4.01 (methylene Flu-H, 1H, s), 6.00-6.30, 6.40-6.70 (CpH, 4H, m), 7.26-7.50 (Flu-H, 3H, m), 7.51 (Flu-H, 1H, d), 7.58 (Flu-H, 1H, d), 7.80 (Flu-H, 1H, d), 7.90 (Flu-H, 2H, d).

At −30° C., 2 equivalents of n-BuLi (2.5 M in Hexane) were slowly added to the (tert-Bu-O—$(CH_2)_6$)MeSi($C_5H_5$)(9-$C_{13}H_9$) (310.1 g, 0.72 mol)/toluene (3.0 L) solution, and the solution was stirred for 8 hours or more while raising the temperature to room temperature. Subsequently, the temperature of the obtained reaction mixture was cooled to −30° C., and then, the slurry solution of ZrCl$_4$(THF)$_2$ (271.7 g, 0.72 mol)/toluene (2.5 L) was slowly added thereto, and the obtained reaction mixture was stirred at room temperature for 8 hours or more. Thereafter, all the volatiles of the reaction product were vacuum dried and a dichoromethane solvent was added to the obtained oily liquid to filter. The filtered solution was vacuum dried, and then, hexane was added to induce precipitation. The obtained precipitate was washed with hexane several times to obtain racemic-(tert-Bu-O—$(CH_2)_6$)MeSi($C_5H_4$)(9-$C_{13}H_8$)ZrCl$_2$ (hereinafter, referred to as 'metallocene catalyst precursor K') in the form of red solid (yield 70%).

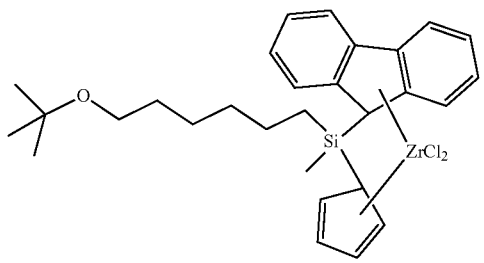

$^1$H NMR (400 MHz, C$_6$D$_6$): 0.66 (MeSi, 3H, s), 1.16 (tert-BuO, 9H, s), 1.35 (Si-CH$_2$, 2H, m), 1.40-1.75 (CH$_2$, 8H, m), 2.70, 3.30 (tert-BuO-CH$_2$, 2H, t), 5.46 (CpH, 2H, br d), 6.46 (CpH, 2H, br s), 7.05-7.20 (Flu-H, 2H, m), 7.34 (Flu-H, 1H, d), 7.39 (Flu-H, 1H, d), 7.46 (Flu-H, 2H, t), 7.89 (Flu-H, 2H, d).

Preparation Example 9: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane(MAO)/toluene solution(Albemarle Corporation) was introduced therein, the temperature was raised to 70° C., and the solution was stirred for 12 hours. Thereafter, the temperature of the reactor was cooled to 40° C., and then, the stirring was stopped and the reaction product was allowed to stand for 10 minutes and decanted. 100 mL of toluene was introduced again into the reactor, and the solution was stirred for 10 minutes, and then, the stirring was stopped and the reaction product was allowed to stand for 10 minutes and decanted.

Subsequently, 50 mL of toluene was introduced into the reactor, the metallocene catalyst precursor A (0.50 g) prepared in the Preparation Example 1 and 30 mL of toluene were introduced, and the solution was stirred at 200 rpm for 90 minutes. Thereafter, the stirring was stopped and the reaction product was allowed to stand for 10 minutes and decanted.

Subsequently, 30 mL of toluene was introduced into the reactor, dimethylsilylenebis(indenyl)zirconium dichloride (CAS Number: 121009-93-6, manufactured by Strem Company, hereinafter referred to as ' metallocene catalyst precursor C') (0.22 g) and 20 mL of toluene were introduced, and the solution was stirred at 200 rpm for 90 minutes. Thereafter, the temperature of the reactor was lowered to room temperature, and the stirring was stopped and the reaction product was allowed to stand for 10 minutes and decanted. And, 100 mL of hexane was introduced into the reactor to obtain slurry, which was then transferred to a 250 mL schlenk flask and decanted. The obtained reaction product was vacuum dried at room temperature for 3 hours to obtain a supported catalyst.

Preparation Example 10: Preparation of a Supported Catalyst

A supported catalyst was prepared by the same method as Preparation Example 9, except that the metallocene catalyst precursor D (0.20 g) prepared in Preparation Example 3 was used instead of the metallocene catalyst precursor C (0.22 g) in Preparation Example 9.

Preparation Example 11: Preparation of a Supported Catalyst

A supported catalyst was prepared by the same method as Preparation Example 9, except that the metallocene catalyst precursor F (0.10 g) prepared in Preparation Example 5 was used instead of the metallocene catalyst precursor C (0.22 g) in Preparation Example 9.

Preparation Example 12: Preparation of a Supported Catalyst

Into a 300 mL glass reactor, 100 mL of toluene was put and 10 g of silica(manufactured by Grace Davison Company, SP2410) was introduced, and then, the solution was stirred while raising the temperature of the reactor to 40° C. And, 30 mL of wt % methylaluminoxane(MAO)/toluene solution(Albemarle Corporation) was introduced therein, the temperature was raised to 70° C., and the solution was stirred at 200 rpm for 12 hours.

Meanwhile, into a schlenk flask, the metallocene catalyst precursor A prepared in Preparation Example 1 (0.50 g), dichloro[rac-ethylenebis(indenyl)]zirconium (CAS Number: 100080-82-8, manufactured by Sigma-Aldrich Company, hereinafter referred to as 'metallocene catalyst precursor G') (0.22 g), 30 mL of toluene, and 0.3 g of triisobutylaluminium were introduced, and the solution was stirred at room temperature for 15 minutes. And the obtained mixture was introduced into the glass reactor, the temperature of the glass reactor was raised to 70° C., and then, the mixture was stirred for 2 hours.

Thereafter, the temperature of the reactor was lowered to room temperature, and then, the stirring was stopped and the reaction product was allowed to stand for 10 minutes and decanted. And, 100 mL of hexane was introduced into the reactor to obtain slurry, which was then transferred to a schlenk flask and decanted. The obtained reaction mixture was vacuum dried at room temperature for 3 hours to obtain a supported catalyst.

Preparation Example 13: Preparation of a Supported Catalyst

A supported catalyst was prepared by the same method as Preparation Example 12, except that the metallocene catalyst precursor C (0.20 g) was used instead of the metallocene catalyst precursor G (0.22 g) in Preparation Example 12.

Preparation Example 14: Preparation of a Supported Catalyst

A supported catalyst was prepared by the same method as Preparation Example 12, except that the metallocene catalyst precursor D (0.25 g) prepared in Preparation Example 3 was used instead of the metallocene catalyst precursor G (0.22 g) in Preparation Example 12.

Preparation Example 15: Preparation of a Supported Catalyst

A supported catalyst was prepared by the same method as Preparation Example 12, except that the metallocene catalyst precursor K (0.18 g) prepared in Preparation Example 8 was used instead of the metallocene catalyst precursor G (0.22 g) in Preparation Example 12.

Preparation Example 16: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane(MAO)/toluene solution (Albemarle Corporation) was introduced therein, the temperature was raised to 70° C., and the solution was stirred for 12 hours. Thereafter, the temperature of the reactor was cooled to 40° C., and then, the stirring was stopped and the reaction product was allowed to stand for 10 minutes and decanted. 100 mL of toluene was introduced again into the reactor, and the solution was stirred for 10 minutes, and then, the stirring was stopped and the reaction product was allowed to stand for 10 minutes and decanted.

Subsequently, 50 mL of toluene was introduced into the reactor, the metallocene catalyst precursor B (0.40 g) prepared in the Preparation Example 2 and 30 mL of toluene were introduced, and the solution was stirred at 200 rpm for 90 minutes. Thereafter, the stirring was stopped and the reaction product was allowed to stand for 10 minutes and decanted.

Subsequently, 30 mL of toluene was introduced into the reactor, the metallocene catalyst precursor E (0.23 g) prepared in Preparation Example 4 and 20 mL of toluene were introduced, and the solution was stirred at 200 rpm for 90 minutes. Thereafter, the temperature of the reactor was lowered to room temperature, and the stirring was stopped and the reaction product was allowed to stand for 10 minutes and decanted. And, 100 mL of hexane was introduced into the reactor to obtain slurry, which was then transferred to a 250 mL schlenk flask and decanted. The obtained reaction product was vacuum dried at room temperature for 3 hours to obtain a supported catalyst.

Preparation Example 17: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane (MAO)/toluene solution (Albemarle Corporation) was introduced therein, the temperature was raised to 70° C., and the solution was stirred at 200 rpm for 12 hours.

Meanwhile, into a schlenk flask, the metallocene catalyst precursor B prepared in Preparation Example 2 (0.40 g), the metallocene catalyst precursor D prepared in Preparation Example 3 (0.31 g), 30 mL of toluene, and 0.3 g of triisobutylaluminium were introduced, and the solution was stirred at room temperature for 15 minutes. And, the obtained mixture was introduced into the glass reactor, the temperature of the glass reactor was raised to 70° C., and then, the mixture was stirred for 2 hours.

Thereafter, the temperature of the reactor was lowered to room temperature, and then, the stirring was stopped and the reaction product was allowed to stand for 10 minutes and decanted. And, 100 mL of hexane was introduced into the reactor to obtain slurry, which was then transferred to a schlenk flask and decanted. The obtained reaction mixture was vacuum dried at room temperature for 3 hours to obtain a supported catalyst.

Preparation Example 18: Preparation of a Supported Catalyst

A supported catalyst was prepared by the same method as Preparation Example 17, except that the metallocene catalyst precursor E (0.23 g) prepared in Preparation Example 4 was used instead of the metallocene catalyst precursor D (0.31 g) prepared in Preparation Example 3.

Preparation Example 19: Preparation of a Supported Catalyst

A supported catalyst was prepared by the same method as Preparation Example 17, except that dichloro[rac-ethylenebis(4,5,6,7-tetrahydro-1-indenyl)]zirconium (CAS Number: 100163-29-9, manufactured by Sigma-Aldrich Company, hereinafter referred to as 'metallocene catalyst precursor H') was used instead of the metallocene catalyst precursor D (0.31 g) prepared in Preparation Example 3.

Preparation Example 20: Preparation of a Supported Catalyst

A supported catalyst was prepared by the same method as Preparation Example 17, except that the metallocene catalyst precursor I (0.30 g) prepared in Preparation Example 6 was used instead of the metallocene catalyst precursor D (0.31 g) prepared in Preparation Example 3.

Preparation Example 21: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane (MAO)/toluene solution (Albemarle Corporation) was introduced therein, the temperature was raised to 70° C., and the solution was stirred at 200 rpm for 12 hours.

Meanwhile, into a schlenk flask, the metallocene catalyst precursor B prepared in Preparation Example 2 (0.30 g), the metallocene catalyst precursor D prepared in Preparation Example 3 (0.26 g), 30 mL of toluene, and 0.5 g of triisobutylaluminium were introduced, and the solution was stirred at room temperature for 15 minutes. And, the obtained mixture was introduced into the glass reactor, the temperature of the glass reactor was raised to 70° C., and then, the mixture was stirred for 2 hours.

Thereafter, the temperature of the reactor was lowered to room temperature, and then, the stirring was stopped and the reaction product was allowed to stand for 10 minutes and decanted. And, 100 mL of hexane was introduced into the reactor to obtain slurry, which was then transferred to a schlenk flask and decanted. The obtained reaction mixture was vacuum dried at room temperature for 3 hours to obtain a supported catalyst.

Preparation Example 22: Preparation of a Supported Catalyst

A supported catalyst was prepared by the same method as Preparation Example 21, except that the metallocene catalyst precursor J (0.2 g) prepared in Preparation Example 7 was used instead of the metallocene catalyst precursor D (0.26 g) prepared in Preparation Example 3.

Preparation Example 23: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane (MAO)/toluene solution (Albemarle Corporation) was introduced therein, the temperature was raised to 70° C., and the solution was stirred at 200 rpm for 12 hours.

Meanwhile, into a schlenk flask, the metallocene catalyst precursor B (0.30 g), the metallocene catalyst precursor C (0.17 g), the metallocene catalyst precursor J (0.15 g), 30 mL of toluene, and 0.5 g of triisobutylaluminium were introduced, and the solution was stirred at room temperature for 15 minutes. And, the obtained mixture was introduced into the glass reactor, the temperature of the glass reactor was raised to 70° C., and then, the mixture was stirred for 2 hours.

Thereafter, the temperature of the reactor was lowered to room temperature, and then, the stirring was stopped and the reaction product was allowed to stand for 10 minutes and decanted. And, 100 mL of hexane was introduced into the reactor to obtain slurry, which was then transferred to a schlenk flask and decanted. The obtained reaction mixture was vacuum dried at room temperature for 3 hours to obtain a supported catalyst.

Preparation Example 24 Preparation of a Supported Catalyst

A supported catalyst was prepared by the same method as Preparation Example 23 except that the metallocene catalyst precursor D (0.13 g) was used instead of the metallocene catalyst precursor C (0.17 g), and the metallocene catalyst precursor K (0.10 g) was used instead of the metallocene catalyst precursor J (0.15 g).

Preparation Example 25: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane (MAO)/toluene solution (Albemarle Corporation) was introduced therein, the temperature was raised to 70° C., and the solution was stirred at 200 rpm for 12 hours. Thereafter, the temperature of the reactor was cooled to 40° C., and then, the stirring was stopped and the reaction product was allowed to stand for 10 minutes and decanted. 100 mL of toluene was introduced again into the reactor, and the solution was stirred for 10 minutes, and then, the stirring was stopped and the reaction product was allowed to stand for 10 minutes and decanted.

Subsequently, 50 mL of toluene was introduced into the reactor, the metallocene catalyst precursor J (0.30 g) and 30 mL of toluene were introduced, and the solution was stirred at 200 rpm for 90 minutes. Thereafter, the stirring was stopped and the reaction product was allowed to stand for 10 minutes and decanted.

Subsequently, 30 mL of toluene was introduced into the reactor, and the metallocene catalyst precursor I (0.33 g) and 20 mL of toluene were introduced, and the solution was stirred at 200 rpm for 90 minutes. Thereafter, the temperature of the reactor was lowered to room temperature, and the stirring was stopped and the reaction product was allowed to stand for 10 minutes and decanted. And, 100 mL of hexane was introduced into the reactor to obtain slurry, which was then transferred to a 250 mL schlenk flask and decanted. The obtained reaction product was vacuum dried at room temperature for 3 hours to obtain a supported catalyst.

Preparation Example 26: Preparation of a Supported Catalyst

A supported catalyst was prepared by the same method as Preparation Example 25, except that the metallocene catalyst precursor K (0.18 g) was used instead of the metallocene catalyst precursor J (0.30 g).

Preparation Example 27: Preparation of a Supported Catalyst

Into a 300 mL glass reactor, 100 mL of toluene was put and 10 g of silica (manufactured by Grace Davison Company, SP2410) was introduced, and then, the solution was stirred while raising the temperature of the reactor to 40° C. And, 30 mL of wt % methylaluminoxane (MAO)/toluene solution (Albemarle Corporation) was introduced therein, the temperature was raised to 70° C., and the solution was stirred at 200 rpm for 12 hours.

Meanwhile, into a schlenk flask, the metallocene catalyst precursor J (0.40 g), the metallocene catalyst precursor H (0.12 g), 30 mL of toluene, and 0.3 g of triisobutylaluminium were introduced, and the solution was stirred at room temperature for 15 minutes. And, the obtained mixture was introduced into the glass reactor, the temperature of the glass reactor was raised to 70° C., and then, the mixture was stirred for 2 hours.

Thereafter, the temperature of the reactor was lowered to room temperature, and then, the stirring was stopped and the reaction product was allowed to stand for 10 minutes and decanted. And, 100 mL of hexane was introduced into the reactor to obtain slurry, which was then transferred to a schlenk flask and decanted. The obtained reaction mixture was vacuum dried at room temperature for 3 hours to obtain a supported catalyst.

Preparation Example 28: Preparation of a Supported Catalyst

A supported catalyst was prepared by the same method as Preparation Example 9, except that the metallocene catalyst precursor F prepared in Preparation Example 5 was used instead of the metallocene catalyst precursor A, and dichloro[bis(6-tert-butoxyhexyl)cyclopentadienyl]zirconium (hereinafter, referred to as 'metallocene catalyst precursor L') was used instead of the metallocene catalyst precursor C.

Example 1: Preparation of Olefin Polymer

Into a 2 L autoclave capable of withstanding high pressure, 2 mL of triethylaluminium (1 M in hexane), 80 g of 1-hexene, and 0.6 kg of hexane were introduced, and the temperature of the mixture was raised to 80° C. while stirring at 500 rpm. And, into the reactor, the supported catalyst prepared in Preparation Example 9 and hexane put in a vial were introduced, and 0.2 kg of hexane was additionally introduced. If the temperature inside of the reactor reached 80° C., ethylene gas was continuously added under pressure of 30 bar, and the reaction mixture was stirred at 500 rpm and polymerized for 1 hour. Thereafter, the stirring was stopped and non-reacted ethylene gas was exhausted. And, the reaction product was filtered to remove the solvent, and then, dried in a vacuum oven of 80° C. for 3 hours to obtain ethylene-1-hexene copolymer.

Examples 2 to 16 and Comparative Examples 1 to 4: Preparation of Olefin Polymer

Olefin polymers were prepared by the same method as Example 1, except that the catalysts described in the following Table 1 were used instead of the supported catalyst of Example 1, and the polymerization conditions were controlled as described in the following Table 1.

TABLE 1

| | Supported catalyst [content, mg] | Composition of metallocene catalyst precursor | The mixing weight ratio of metallocene catalyst precursor | Polymerization time[minute] | H$_2$ input [mol %] |
|---|---|---|---|---|---|
| Example 1 | Preparation Example 9 [60.2] | A/C | 10/4.40 | 60 | 0.10 |
| Example 2 | Preparation Example 10 [32.1] | A/D | 10/4.00 | 60 | 0.13 |
| Example 3 | Preparation Example 11 [52.7] | A/F | 10/2.00 | 58 | 0.15 |
| Example 4 | Preparation Example 12 [27.3] | A/G | 10/4.40 | 60 | 0.08 |
| Example 5 | Preparation Example 13 [38.8] | A/C | 10/4.00 | 40 | 0.11 |
| Example 6 | Preparation Example 14 [22.2] | A/D | 10/5.00 | 60 | 0.13 |
| Example 7 | Preparation Example 15 [35.5] | A/K | 10/3.60 | 60 | 0.12 |
| Example 8 | Preparation Example 16 [32.3] | B/E | 10/5.75 | 60 | 0.12 |
| Example 9 | Preparation Example 17 [18.8] | B/D | 10/7.75 | 60 | 0.14 |
| Example 10 | Preparation Example 18 [26.2] | B/E | 10/5.75 | 60 | 0.13 |
| Example 11 | Preparation Example 19 [30.7] | B/H | 10/6.75 | 45 | 0.13 |
| Example 12 | Preparation Example 20 [28.6] | B/I | 10/7.50 | 60 | 0.12 |

TABLE 1-continued

| | Supported catalyst [content, mg] | Composition of metallocene catalyst precursor | The mixing weight ratio of metallocene catalyst precursor | Polymerization time [minute] | $H_2$ input [mol %] |
|---|---|---|---|---|---|
| Example 13 | Preparation Example 21 [16.6] | B/D | 10/8.67 | 43 | 0.15 |
| Example 14 | Preparation Example 22 [20.9] | B/J | 10/7.33 | 60 | 0.10 |
| Example 15 | Preparation Example 23 [32.6] | B/C/J | 10/5.67/5.00 | 60 | 0.10 |
| Example 16 | Preparation Example 24 [35.5] | B/D/K | 10/4.33/3.33 | 60 | 0.13 |
| Comparative Example 1 | Preparation Example 25 [45.7] | I/J | 10/9.09 | 50 | 0.10 |
| Comparative Example 2 | Preparation Example 26 [50.0] | I/K | 10/5.45 | 60 | 0.10 |
| Comparative Example 3 | Preparation Example 27 [38.2] | J/H | 10/3.00 | 60 | 0.13 |
| Comparative Example 4 | Preparation Example 28 [30.5] | F/L | 10/4.40 | 60 | 0.10 |

Comparative Examples 5 and 6: Olefin Polymer Product

In order to compare the properties of the olefin polymer prepared in Examples and Comparative Examples with the properties of commercial products, the LUCENE™ SP330 product of LG Chem., which is commercial mLLDPE prepared using a slurry loop polymerization process, was prepared as Comparative Example 5, and the LUCENE™ SP330 product of LG Chem., which is commercial mLLDPE using a slurry loop polymerization process, was prepared as Comparative Example 6.

Experimental Example: Evaluation of Activities of Supported Catalysts and Properties of Olefin Polymers The activities of the catalysts used in Examples 1 to 16 and Comparative Examples 1 to 4, the properties of the olefin polymers prepared using the catalysts, and the properties of the olefin polymer products of Comparative Example 5 and Comparative Example 6 are described in the following Table 2.

Specifically, the mass of the catalyst used for the polymerization reaction and the mass of the polymer obtained from the reaction were measured to calculate the activity of each catalyst used in Examples and Comparative Examples, and the results are described in the following Table 2.

Melt Flow Rate Ratio (MFRR (10/2.16)) was calculated by dividing $MFR_{10}$ by $MFR_{2.16}$, wherein $MFR_{10}$ was measured at a temperature of 230° C. under a load of 10 kg according to ISO 1133, and $MFR_{2.16}$ was measured at a temperature of 230° C. under a load of 2.16 kg according to ISO 1133.

The melting temperature (TM) of the olefin polymer was measured using a Differential Scanning calorimeter (DSC, device name: DSC 2920, manufacturing company: TA instrument). Specifically, the olefin polymer was heated to 220° C., and then, the temperature was maintained for 5 minutes, and cooled to 20° C., and then, heated again to 220° C., thus obtaining Tm. Here, the temperature rise speed and drop speed were respectively controlled to 10° C./min.

Finally, using GPC (gel permeation chromatography, manufactured by Water Company), the weight average molecular weight (Mw) and the number average molecular weight (Mn) of the olefin polymer were measured, and polydispersity index (PDI) was calculated by dividing the weight average molecular weight by the number average molecular weight. Here, the analysis temperature was set to 160° C., trichlorobenzene was used as a solvent, and the molecular weight was measured by standardization with polystyrene.

TABLE 2

| | Catalytic activity [kgPol/gCat] | MFRR (10/2.16) | Tm [° C.] | Mw [×10⁴ g/mol] | PDI |
|---|---|---|---|---|---|
| Example 1 | 1.5 | 10.2 | 121.2 | 10.0 | 3.5 |
| Example 2 | 3.1 | 12.1 | 125.2 | 12.2 | 3.6 |
| Example 3 | 1.9 | 10.2 | 120.2 | 9.0 | 4.2 |
| Example 4 | 2.8 | 12.3 | 120.4 | 10.5 | 3.6 |
| Example 5 | 1.9 | 11.7 | 121.3 | 9.9 | 3.7 |
| Example 6 | 3.8 | 13.0 | 125.7 | 10.2 | 3.7 |
| Example 7 | 2.0 | 9.9 | 123.2 | 10.5 | 3.1 |
| Example 8 | 2.1 | 12.2 | 122.1 | 12.5 | 3.1 |
| Example 9 | 3.1 | 13.0 | 125.0 | 11.1 | 3.6 |
| Example 10 | 2.7 | 12.5 | 121.1 | 11.9 | 3.2 |
| Example 11 | 2.5 | 11.0 | 121.5 | 12.0 | 3.0 |
| Example 12 | 2.5 | 9.8 | 122.0 | 10.4 | 3.0 |
| Example 13 | 4.0 | 14.2 | 125.9 | 10.9 | 3.8 |
| Example 14 | 3.5 | 11.1 | 122.1 | 12.0 | 3.2 |
| Example 15 | 2.2 | 10.2 | 122.0 | 11.5 | 4.2 |
| Example 16 | 2.8 | 12.7 | 124.9 | 12.2 | 4.5 |
| Comparative Example 1 | 2.1 | 8.5 | 122.1 | 11.0 | 3.0 |
| Comparative Example 2 | 1.8 | 8.8 | 123.0 | 11.5 | 2.9 |
| Comparative Example 3 | 2.5 | 9.0 | 121.0 | 10.2 | 3.3 |

TABLE 2-continued

| | Catalytic activity [kgPol/gCat] | MFRR (10/2.16) | Tm [° C.] | Mw [×10⁴ g/mol] | PDI |
|---|---|---|---|---|---|
| Comparative Example 4 | 3.0 | 8.2 | 121.8 | 10.0 | 3.0 |
| Comparative Example 5 | — | 7.7 | 123.0 | 13.0 | 2.8 |
| Comparative Example 6 | — | 7.2 | 117.0 | 11.1 | 2.8 |

Referring to Table 2, it is confirmed that using the supported catalyst according to one embodiment of the present invention, olefin polymer with improved processibility compared to the existing mLLDPE can be provided.

The invention claimed is:

1. A supported hybrid catalyst comprising a carrier; a transition metal compound represented by following Chemical Formula 3 or 4, which is supported on the carrier; and dimethylsilylene(tetramethylcyclopentadienyl)(9H-flouren-9-yl)zirconium dichloride which is supported on the carrier,
wherein a weight ratio of the transition metal compound to dimethylsilylene(tetramethylcyclopentadienyl)(9H-flouren-9-yl)zirconium dichloride is from 10:1 to 10:12:

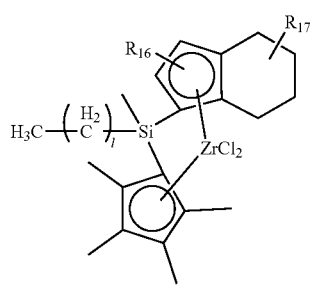

[Chemical Formula 3]

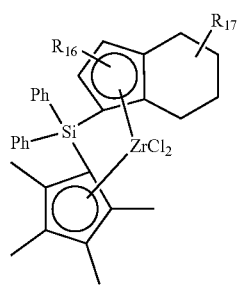

[Chemical Formula 4]

in Chemical Formulae 3 and 4, $R_{16}$ and $R_{17}$, identical to or different from each other, are each independently hydrogen, a C1-20 alkyl group, a C1-20 alkoxy group, a C2-20 alkoxyalkyl group, a C1-20 alkylsilyl group, a C1-20 silylalkyl group, a C1-20 alkoxysilyl group, a C1-20 silyloxyalkyl group, a C2-20 alkenyl group, a C6-20 aryl group, a C7-20 alkylaryl group, or a C7-20 arylalkyl group, and
l is an integer of 0 to 5.

2. The supported hybrid catalyst according to claim 1, further comprising one or more kinds of cocatalysts selected from the group consisting of the compounds represented by following Chemical Formulas 5, 6 and 7:

$$R_{19}-[Al(R_{18})-O]_n-R^{20}$$ [Chemical Formula 5]

in Chemical Formula 5,
$R_{18}$, $R_{19}$ and $R_{20}$ are each independently hydrogen, halogen, a C1-20 hydrocarbyl group, or a C1-20 hydrocarbyl group substituted with halogen, and
n is an integer of 2 or more, $$D(R_{21})_3$$ [Chemical Formula 6]

in Chemical Formula 6,
D is aluminium or boron,
$R_{21}$'s are each independently halogen, a C1-20 hydrocarbyl group, or a C1-20 hydrocarbyl group substituted with halogen, $$[L-H]^+[Z(A)_4]^- \text{ or } [L]^+[Z(A)_4]^-$$ [Chemical Formula 7]

in Chemical Formula 7,
L is neutral or a cationic Lewis base, H is a hydrogen atom,
Z is a Group 13 atom, A's are each independently a C1-20 hydrocarbyl group; a C1-20 hydrocarbyloxy group; or a C1-20 hydrocarbyl group or a C1-20 hydrocarbyloxy group of which one or more hydrogen atoms are substituted with halogen, a C1-20 hydrocarbyloxy group or a C1-20 hydrocarbylsilyl group.

3. The supported hybrid catalyst according to claim 1, wherein the carrier is silica, alumina, magnesia or a mixture thereof.

4. A method for preparing olefin polymer comprising the step of polymerizing olefin monomers in the presence of the supported hybrid catalyst of claim 1.

5. The method according to claim 4, wherein the olefin monomer includes one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

* * * * *